United States Patent
An et al.

(10) Patent No.: US 12,328,640 B2
(45) Date of Patent: Jun. 10, 2025

(54) METHOD AND SYSTEM FOR SELECTING GATE USING POSITIONING INFORMATION

(71) Applicant: Samsung Electronics Co., Ltd., Suwon-si (KR)

(72) Inventors: Kisoo An, Suwon-si (KR); Mingyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 17/837,569

(22) Filed: Jun. 10, 2022

(65) Prior Publication Data

US 2022/0400356 A1 Dec. 15, 2022

(30) Foreign Application Priority Data

Jun. 11, 2021 (KR) .................. 10-2021-0076358

(51) Int. Cl.
*H04W 4/02* (2018.01)
*H04W 4/029* (2018.01)
*H04W 4/70* (2018.01)
*G06Q 50/40* (2024.01)

(52) U.S. Cl.
CPC .......... *H04W 4/023* (2013.01); *H04W 4/029* (2018.02); *H04W 4/70* (2018.02); *G06Q 50/40* (2024.01)

(58) Field of Classification Search
CPC ....... H04W 4/023; H04W 4/029; H04W 4/70; H04W 4/026; E05F 15/76; E05F 15/77; G06Q 20/4015

See application file for complete search history.

(56) References Cited

U.S. PATENT DOCUMENTS

| | | | |
|---|---|---|---|
| 2016/0358385 A1 | 12/2016 | Ziebell et al. | |
| 2020/0157875 A1* | 5/2020 | Jones | E05F 15/76 |
| 2020/0334935 A1 | 10/2020 | Lopez et al. | |
| 2022/0335759 A1* | 10/2022 | Shin | G07C 9/00563 |

FOREIGN PATENT DOCUMENTS

| | | |
|---|---|---|
| CN | 109982245 B | 1/2021 |
| CN | 112649827 A | 4/2021 |
| KR | 10-1716382 B1 | 3/2017 |
| KR | 10-2179371 B1 | 11/2020 |

OTHER PUBLICATIONS

International Search Report and Written Opinion dated Sep. 8, 2022, issued in International Patent Application No. PCT/KR2022/008252.

* cited by examiner

*Primary Examiner* — Vernal U Brown
(74) *Attorney, Agent, or Firm* — Jefferson IP Law, LLP

(57) ABSTRACT

A method of a user terminal is provided. The method includes selecting two gates from among a plurality of gates, based on location information of the plurality of gates and location information of the user terminal, identifying whether the user terminal enters a radio access area on the basis of a value of an included angle between the two gates and the user terminal and, in response to the user terminal being entered the radio access area, selecting a first gate to perform radio access from among the two gates.

20 Claims, 18 Drawing Sheets (a)

(b)

METHOD AND SYSTEM FOR SELECTING GATE USING POSITIONING INFORMATION

CROSS-REFERENCE TO RELATED APPLICATION(S)

This application is based on and claims priority under 35 U.S.C. § 119(a) of a Korean patent application number 10-2021-0076358, filed on Jun. 11, 2021, in the Korean Intellectual Property Office, the disclosure of which is incorporated by reference herein in its entirety.

BACKGROUND

1. Field

The disclosure relates to a method of selecting a gate capable of performing authentication or payment using a location of a user terminal.

2. Description of Related Art

The Internet, which is a human centered connectivity network where humans generate and consume information, is now evolving to the Internet of things (IoT) where distributed entities, such as things, exchange and process information. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

As various services can be provided according to the development of wireless communication systems, a method of effectively providing the services is needed. For example, a ranging technology for measuring the distance between electronic devices using an ultra-wideband (UWB) may be used. The UWB is a wireless communication technology using a very wide frequency band higher than or equal to several gigahertz (GHz) in a baseband without the use of a radio carrier.

The above information is presented as background information only to assist with an understanding of the disclosure. No determination has been made, and no assertion is made, as to whether any of the above might be applicable as prior art with regard to the disclosure.

SUMMARY

A scheme for tagging a card to get in or get out of a gate such as a subway gate has been widely used. A near field communication (NFC) scheme is mainly used as the card tagging scheme, and a short-range wireless communication scheme is used in most cases in which case a card recognition distance is short. In general, recognition is possible within a distance of 5 cm between the user's card and a terminal of the gate, and the user may considerably inconvenience to tag the card if the user who passes through the gate has baggage or wears gloves. The user takes an action of putting down the baggage near a card tagging device, drawing out the card, and then performing tagging or taking off the gloves near the card tagging device, drawing out the card, and then performing tagging, and thus passage delay occurs. Further, due to the spread of COVID-19, needs for a non-contact transportation card system have recently arisen.

However, the conventional method has difficulty in precisely determining gate passage during a time at which users are concentrated and thus also has difficulty in accurately performing authentication or payment for the user's gate passage. Accordingly, a new method capable of precisely determining the user's gate passage and accurately performing authentication or payment when the user passes through the gate is needed.

Aspects of the disclosure are to address at least the above-mentioned problems and/or disadvantages and to provide at least the advantages described below. Accordingly, an aspect of the disclosure is to provide a method of selecting a gate for authentication and payment on the basis of a location of a user terminal. An embodiment of the disclosure discloses a method of calculating angles between the location of a user terminal and a plurality of pre-installed gates, tacking a user's path, determining whether the user enters or leaves the gate, designating a gate which the user enters or leaves, and providing a time point at which authentication and payment for a specific gate are performed, thereby providing an accurate authentication and payment service to the user passing through a plurality of gates.

Additional aspects will be set forth in part in the description which follows and, in part, will be apparent from the description, or may be learned by practice of the presented embodiments.

In accordance with an aspect of the disclosure, a method of a user terminal is provided. The method includes selecting two gates from among a plurality of gates, based on location information of the plurality of gates and location information of the user terminal, identifying whether the user terminal enters a radio access area, based on a value of an included angle between the two gates and the user terminal, and, when it is identified that the user terminal enters the radio access area, selecting a first gate to perform radio access from among the two gates.

In accordance with another aspect of the disclosure, the method further includes transmitting a request for radio access to the first gate, identifying whether the user terminal has passed the gates, based on the value of the included angle between the two gates and the user terminal, and transmitting a request for approving authentication or payment or a request for cancelling the authentication or the payment, based on identification of whether the user terminal has passed the gates.

According to various embodiments of the disclosure, the location information of the user terminal may be measured in real time and the location information of the user terminal may be periodically received.

According to various embodiments, the included angle may be calculated in real time while the user terminal passes the gates after the user terminal selects the two gates.

According to various embodiments of the disclosure, the identifying whether the user terminal enters the radio access area may include identifying whether the included angle is larger than or equal to a specific angle.

According to various embodiments, when it is identified that the user terminal has not entered the radio access area, the user terminal may select two gates from among the plurality of gates.

According to various embodiments of the disclosure, the first gate may be selected by calculating a rotation angle between a perpendicular vector corresponding to a progress direction of the user terminal in a triangle formed by the user terminal and the two gates and a vector formed by the user terminal and one gate.

According to various embodiments of the disclosure, the identifying whether the user terminal has passed through the gates may include identifying a rotation angle between a vector from the first gate to the user terminal and a vector from the first gate to the other one of the two gates.

According to various embodiments of the disclosure, it is identified that the user terminal has not passed the gates when the second included angle is larger than or equal to a specific value, and it is identified that the user terminal has passed the gates when the second included angle is smaller than the specific value.

In accordance with an aspect of the disclosure, a user terminal is provided. The user terminal includes a transceiver, and at least one processor, wherein the at least one processor is configured to select two gates from among a plurality of gates, based on location information of the plurality of gates and location information of the user terminal, identify whether the user terminal enters a radio access area, based on a value of an included angle between the two gates and the user terminal, and, when it is identified that the user terminal enters the radio access area, select a first gate to perform radio access from among the two gates.

According to various embodiments of the disclosure, the at least one processor is further configured to transmit a request for radio access to the first gate through the transceiver, identify whether the user terminal has passed the gates, based on the value of the included angle between the two gates and the user terminal, and transmit a request for approving authentication or payment or a request for cancelling the authentication or the payment through the transceiver, based on identification of whether the user terminal has passed the gates.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
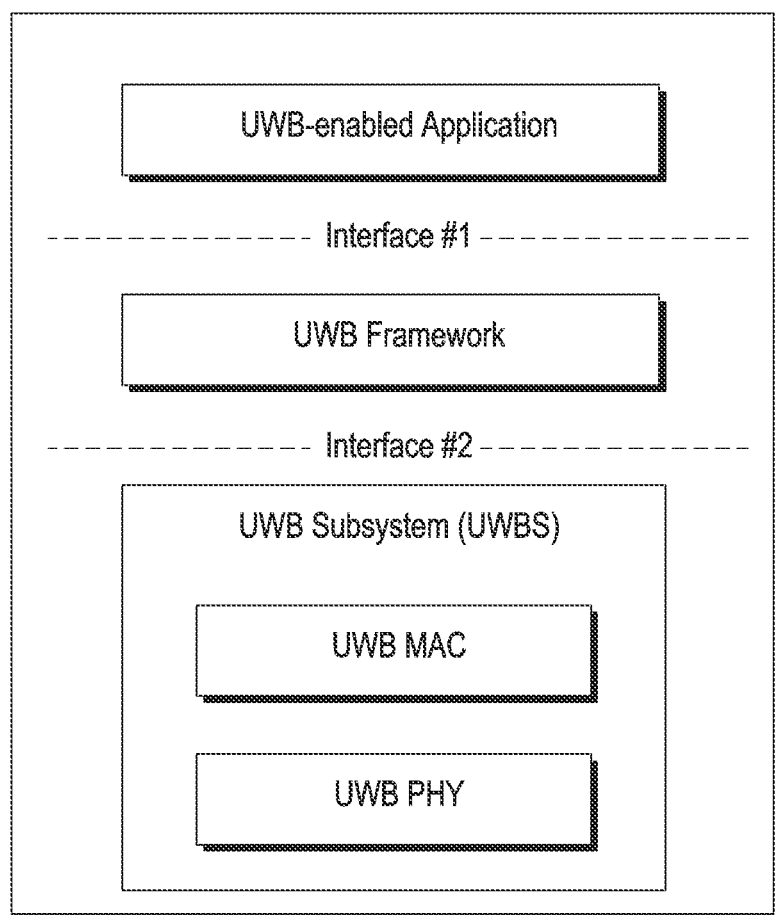
FIG. 1 illustrates architecture of a UWB device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

As used herein, the term "terminal" or "device" may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile mode, a mobile, and others. Various examples of the terminal may include a cellular phone, a smartphone having a wireless communication function, an image capture device, such as a digital camera, having a wireless communication function, a gaming device having a wireless communication function, a music storage and playback home appliance having a wireless communication function, an Internet home appliance capable of wireless Internet access and browsing, and portable units or terminals with which a combination of these functions is integrated. Furthermore, the terminal may include a machine to machine (M2M) terminal and a machine type communication (MTC) terminal/device, but is not limited thereto. In the specification, the terminal may also be referred to as "electronic device" or simply as "device".

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, embodiments of the disclosure will be described in detail in conjunction with the accompanying drawings. The following detailed description of embodiments of the disclosure is directed to a communication system using a UWB by way of example, but the embodiments of the disclosure may be applied to other communication systems having similar technical backgrounds or characteristics. Examples thereof may include a communication system using Bluetooth or Zigbee, and the like. Therefore, based on determinations by those skilled in the art, the examples of the disclosure may also be applied to other communication systems through some modifications without significantly departing from the scope of the disclosure.

In addition, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In general, a wireless sensor network technology is largely divided into a wireless local area network (WLAN) technology and a wireless personal area network (WPAN) technology according to the recognized distance. At this time, the WLAN corresponds to a technology based on institute of electrical and electronics engineers (IEEE) 802.11 capable of accessing a backbone network within a radius of 100 m. Further, the WPAN corresponds to a technology based on IEEE 802.15 and may include Bluetooth, ZigBee, ultra-wideband (UWB), and the like. A wireless network for implementing the wireless network technologies may include a plurality of electronic devices.

The UWB may be a short-distance high-speed wireless communication technology using a wide frequency band higher than or equal to several GHz, a low spectrum density, and a short pulse width (1 to 4 nsec) in a baseband state. The UWB may be a band itself to which UWB communication is applied. The UWB allows secure and accurate ranging between devices. Accordingly, the UWB enables relative location estimation based on the distance between two devices or accurate location estimation of a device based on the distance from fixed devices (of which locations are known).

Specific terms used in the following description are provided to assist understanding of the disclosure, and the use of the specific terms may be modified in different forms without departing from the technical idea of the disclosure.

An "application dedicated file (ADF)" may be a data structure within application data structure capable of hosting, for example, an application or application-specific data.

An "application protocol data unit (APDU)" may be a command and a response used for communication with application data structure within a UWB device.

"Application-specific data" may be, for example, a file structure having a root level and an application level including UWB controlee information and UWB session data required for a UWB session.

A "controller" may be a ranging device for defining and controlling ranging control messages (RCMs) (or control messages).

A "controlee" may be a ranging device using a ranging parameter within an RCM (or a control message) received from a controller.

A "dynamic scrambled timestamp sequence (STS) mode" may be an operation mode in which the STS is not repeated for a ranging session unlike a "static STS". In this mode, the STS may be managed by a ranging device and a ranging session key for generating the STS may be managed by a secure component.

An "applet" may be an applet executed on a secure component including UWB parameters and service data. In the disclosure, the applet may be a FiRa applet defined by FiRa.

A "ranging device" may be a device capable of performing UWB ranging. In the disclosure, the ranging device may be an enhanced ranging device (ERDEV) defined in IEEE 802.15.4z or a FiRa device defined by FiRa. The ranging device may be referred to as a UWB device.

A "UWB-enabled application" may be an application for a UWB service. For example, the UWB-enabled application may be an application using a framework API for configuring an out-of-band (OOB) connector, a secure service, and/or a UWB service for a UWB session. In the disclosure, the "UWB-enabled application" may be abbreviated as an application or a UWB application. The UWB-enabled application may be a FiRa-enabled application defined by FiRa.

A "framework" may be a component for providing access to a profile, an individual UWB configuration, and/or a notification. The "framework" may be a set (collection) of logical software components including, for example, a profile manager, an OOB connector, a secure service, and/or a UWB service. In the disclosure, the framework may be a FiRa framework defined by FiRa.

An "OOB connector" may be a software component for configuring an out-of-band (OOB) connection (for example, a BLE connection) between ranging devices. In the disclosure, the OOB connector may be a FiRa OOB connector defined by FiRa.

A "profile" may be a predefined set of a UWB and an OOB configuration parameter. In the disclosure, the profile may be a FiRa profile defined by FiRa.

A "profile manager" may be a software component for implementing a profile available by a ranging device. In the disclosure, the profile manager may be a FiRa profile manager defined by FiRa.

A "service" may be implementation of a use case for providing a service to an end-user.

A "smart ranging device" may be a ranging device capable of implementing an optional framework API. In the disclosure, the smart ranging device may be a FiRa smart device defined by FiRa.

A "global dedicated file (GDF)" may be a root level of application-specific data including data required for configuring a USB session.

A "framework API" may be an API used by a UWB-enabled application for communication with a framework.

An "initiator" may be ranging device initiating a ranging exchange.

An "object identifier (OID)" may be an identifier of an ADF within an application data structure.

An "out-of band (OOB)" may be data communication that does not use a UWB as an underlying wireless technology.

A "ranging data set (RDS)" may be data (for example, a UWB session key, a session identification (ID), or the like) required for configuring a UWB session required to protect confidentiality, authenticity, and integrity.

A "responder" may be a ranging device transmitting a response to an initiator in a ranging exchange.

An "STS" may be a ciphered sequence for increasing integrity and accuracy of ranging measurement timestamps. The STS may be generated from a ranging session key.

A "secure channel" may be a data channel for preventing overhearing and tempering.

A "secure component" may be an entity (for example, an SE or a trusted execution environment (TEE)) having a defined security level which interfaces with a UWBS in order to provide an RDS to the UWBS when, for example, a dynamic STS is used.

A "secure element (SE) may be a tamper-resistant secure hardware component which may be used as a secure component within a ranging device.

"Secure ranging" may be ranging based on an STS generated through a robust ciphering operation.

A "secure service" may be software component for interfacing with a secure component such as a secure element or a trusted execution environment (TEE).

A "service applet" may be an applet on a secure component handling a service-specific transaction.

"Service data" may be data defined by a service provider, which is required to be transmitted between two ranging devices in order to implement a service.

A "service provider" may be an entity for defining and providing hardware and software required for providing a specific service to an end-user.

A "static STS mode" is an operation mode in which an STS is repeated during a session and does not need to be managed by a secure component.

A "secure UWB service (SUS) applet" may be an applet on an SE communicating with an applet in order to search for data required for enabling a secure UWB session with another ranging device. Further, the SUS applet may transmit corresponding data (information) to a UWBS.

A "UWB service" may be a software component providing access to a UWBS.

A "UWB session" may be a time period from the start of communication between a controller and a controlee through a UWB to the stop of the communication. The UWB session may include ranging, data transmission, or both the ranging and the data transmission.

A "UWB session ID" may be an ID (for example, a 32-bit integer) for identifying a UWB session shared between a controller and a controlee.

A "UWB session key" may be a key used for protecting a UWB session. The UWB session key may be used to generate an STS. In the disclosure, the UWB session key may be a UWB ranging session key (URSK) and may be abbreviated as a session key.

A "UWB subsystem (UWBS)" may be a hardware component implementing a UWB physical layer (PHY) and media access control (MAC) specifications. The UWBS may have an interface for a framework and an interface for a secure component for searching for an RDS. In the disclosure, the UWB PHY and the MAC specifications may be, for example, a FiRa PHY and FiRa MAC specifications defined by FiRa referring to IEEE 802.15.4/4z.

In the description of the disclosure, if it is determined that a detailed description of a relevant known function or configuration makes the subject of the disclosure unclear, the detailed description is omitted.

Various embodiments of the disclosure are described with reference to the accompanying drawings.

FIG. 1 illustrates architecture of a UWB device according to an embodiment of the disclosure.

The UWB device (electronic device) of FIG. 1 may be a ranging device supporting UWB ranging (for example, UWB secure ranging). In an embodiment, the ranging device may be an enhanced ranging device (ERDEV) defined in IEEE 802.15.4z or a FiRa device defined by FiRa.

In an embodiment of FIG. 1, the UWB may interact with another UWB device through a UWB session.

Further, the UWB device may implement a first interface (interface #1) which is an interface between a UWB-enabled application and a framework, and the first interface may allow the UWB-enabled application in the UWB device to use UWB capabilities of the UWB device in a predetermined scheme. In an embodiment, the first interface may be a framework API or a proprietary interface, but is not limited thereto.

Further, the UWB device may implement a second interface (interface #2) which is an interface between a framework and a UWB subsystem (UWBS). In an embodiment, the second interface may be a UWB command interface (UCI) or a proprietary interface, but is not limited thereto.

Referring to FIG. 1, the UWB device may include a UWB-enabled application, a framework, and/or a UWBS including a UWB MAC layer and a UWB physical layer. According to an embodiment, some entities may not be included in the UWB device or an additional entity (for example, security layer) may be further included.

The UWB-enabled application may trigger a configuration of a UWB session by the UWBS through the first interface. Further, the UWB-enabled application may use one of the predefined profiles. For example, the UWB-enabled application may use one of the profiles defined in FiRa or a custom profile. The UWB-enabled application may handle relevant events such as service discovery, ranging notifications, and/or error conditions through the first interface.

The framework may provide access to a profile, an individual UWB configuration, and/or a notification. The framework may be a set of software components. As described above, the UWB-enabled application may interface with the framework through the first interface, and the framework may interface with the UWBS through the second interface. Software components of the framework may include, for example, a profile manager, an OOB connector, a secure service, and/or a UWB service.

The profile manager may serve to manage profiles which may be used by the UWB device. The profile may be a set of parameters required for establishing communication between UWB devices. For example, the profile may include a parameter indicating which OOB secure channel is used, a UWB/OOB configuration parameters, a parameter indicating whether the use of a specific secure component is mandatory, and/or a parameter related to a file format of an ADF.

The OOB connector may serve to establish an OOB connection between UWB devices. The OOB connector may handle an OOB step including a discovery step and a connection step. The OOB step is described below with reference to FIG. 4.

The secure service may serve to interface with the secure component such as an SE or a TEE.

The UWB service may serve to manage the UWBS. The UWB service may provide access to the UWBS from the profile manager by implementing the second interface.

The UWBS may be a hardware component including a UWB MAC layer and a UWB physical layer. The UWBS may manage a UWB session and communicate with a UWBS of another UWB device. The UWBS may interface with the framework through the second interface and acquire an RDS from the secure component.

Figure 2:
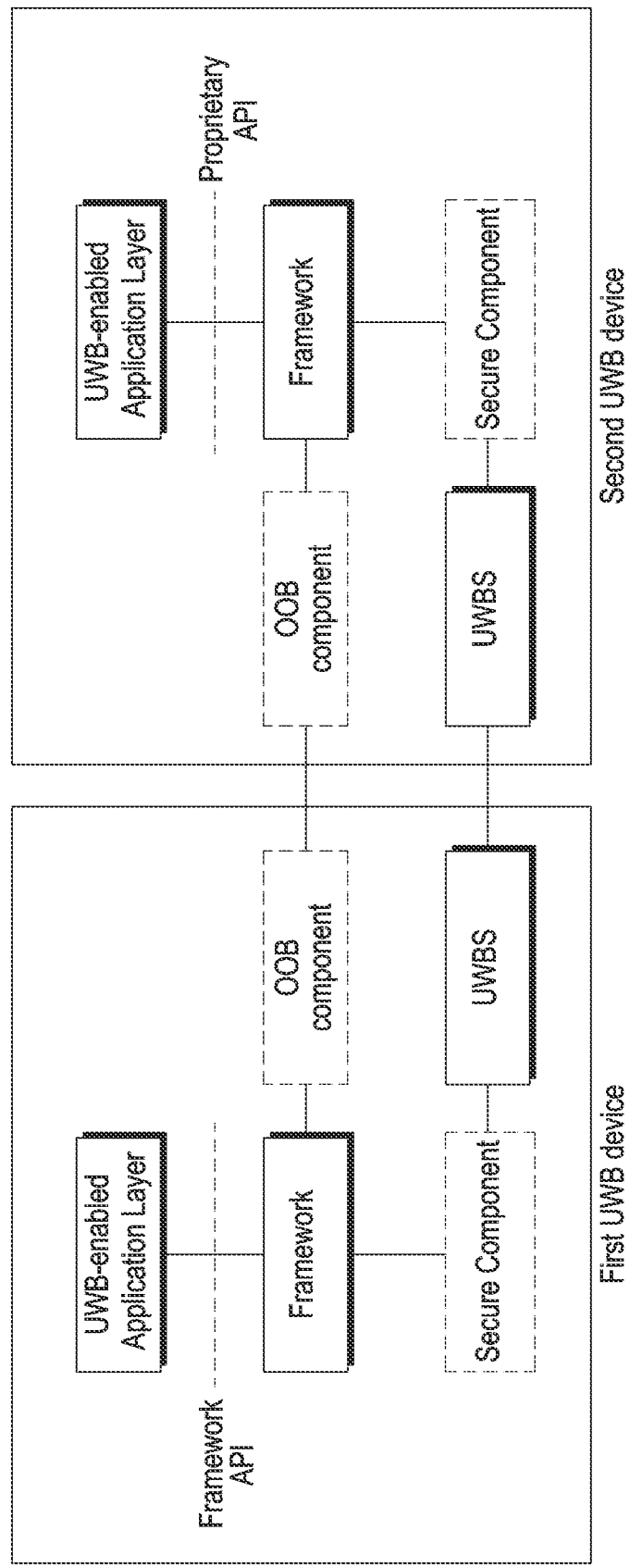
FIG. 2 illustrates a configuration of a communication system including a UWB device according to an embodiment of the disclosure.

FIG. 2 illustrates a configuration of a communication system including UWB devices according to an embodiment of the disclosure.

Referring to FIG. 2, the communication system includes a first UWB device and a second UWB device. In an embodiment, the first UWB device and the second UWB device may be, for example, the UWB device of FIG. 1 or an electronic device including the UWB device of FIG. 1.

The first UWB device may host, for example, one or more UWB-enabled applications which may be installed by a user (for example, a mobile phone). This may be based on, for example, a framework API. The second UWB device may use a proprietary interface to implement, for example, a specific UWB-enabled application without providing the framework API. Meanwhile, unlike FIG. 2, both the first UWB device and the second UWB device may be ranging devices using the framework API or both the first UWB device and the second UWB device may be ranging devices using the proprietary interface according to an embodiment of the disclosure.

The first UWB device and the second UWB device may include a UWB-enabled application layer, a framework, an OOB component, a secure component, and/or a UWBS. Meanwhile, in the disclosure, the OOB component and/or the secure component are optional components and may not be included in the UWB device according to an embodiment of the disclosure.

The framework may serve to provide access to a profile, an individual UWB configuration, and/or a notification. The framework is a set of software components and may include, for example, a profile manager, an OOB connector, a secure service, and/or a UWB service. The above description is referred to for a description of each component.

The OOB component may be a hardware component including a MAC layer and/or a physical layer for OOB communication (for example, BLE communication). The OOB component may communicate with an OOB component of another device. In an embodiment of the disclosure, the first UWB device and the second UWB device may generate an OOB connection (channel) through the OOB component and exchange parameters for establishing a UWB session through the OOB channel. In the disclosure, the OOB component may be referred to as an OOB subsystem.

The UWBS may be a hardware component including a UWB MAC layer and a UWB physical layer. The UWBS may manage a session and communication with a UWBS of another UWB. In an embodiment of the disclosure, the first UWB device and the second UWB device may perform UWB ranging and transaction of service data through the UWB session established through the UWBS on the basis of the exchanged parameters.

The secure component may be a hardware component interfacing with the framework and/or the UWBS to provide the RDS.

In the disclosure, the UWB-enabled application layer and/or the framework may be implemented by an application processor (AP) (or processor). Accordingly, in the disclosure, the operation of the UWB-enabled application layer and/or the framework may be performed by an application processor (AP) (or processor).

Figure 3:
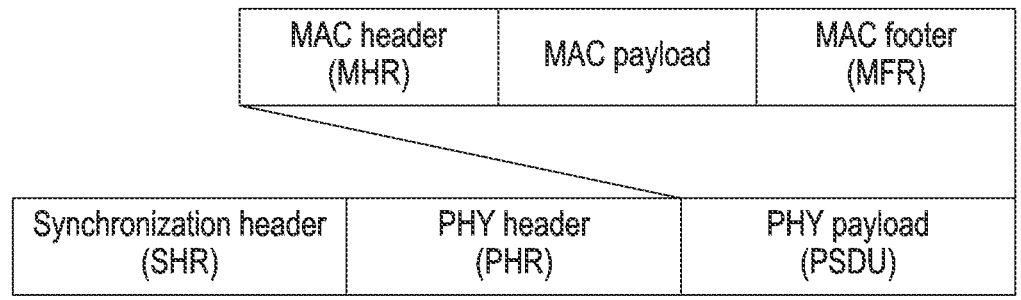
FIG. 3 illustrates a structure of a frame used for UWB communication according to an embodiment of the disclosure.
Figure 3:
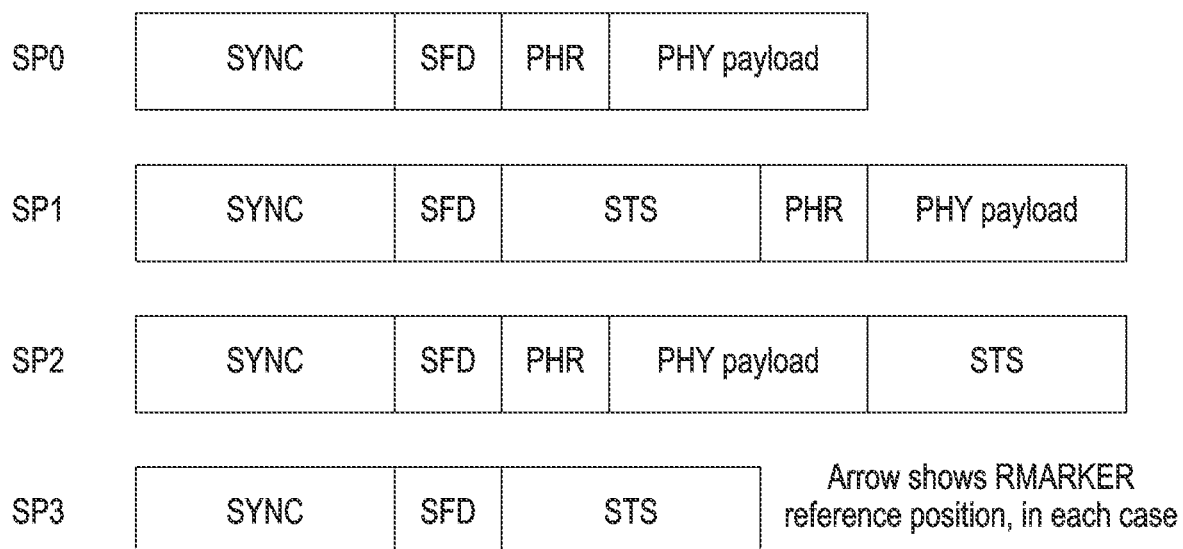

FIG. 3 illustrates a structure of a frame used for UWB communication according to an embodiment of the disclosure.

Part (a) of FIG. 3 illustrates a structure of a frame to which an STS packet configuration is not applied, and part (b) of FIG. 3 illustrates a structure of a frame to which an STS packet configuration is applied. In an embodiment of the disclosure, the frame may be a ranging frame (RFRAME) for transmitting ranging data (for example, ranging initiation/response/final message) or a data frame for transmitting other data (for example, service data).

Referring to part (a) of FIG. 3, a frame or a PHY PDU physical layer protocol data unit (PPDU) for transmitting a frame may include a synchronization header (SHR), a PHY header (PHR), and a PHY payload (PSDU). The PSDU may include a MAC frame, and the MAC frame may include a MAC header (MHR), a MAC payload, and/or a MAC footer (MFR). The SHR of the PPDU may include a SYNC field and a start-of-frame delimiter (SFD). The SFD field may be a field indicating the end of the SHR and the start of the data field. The description defined in IEEE 802.15.4/4z and/or FiRa is referred to for a description of each element/field included in the PPDU and the MAC frame.

Meanwhile, the PHY layer of the UWB device may include an optional mode for providing reduced on-air time for high density/low-power operation. The frame may include a ciphered sequence (that is, STS) for increasing integrity and accuracy of the ranging measurement timestamp. The STS may be used for security ranging.

The structure of the PDDU (or frame) in the case in which the STS packet configuration is applied (supported) may be as shown in part (b) of FIG. 3.

Referring to part (b) of FIG. 3, when the STS packet (SP) configuration is 0 (SP0), the STS field is not included in the PPDU (SP0 packet). When the SP configuration is 1 (SP1), the STS field is located right after the start-of-frame delimiter (SFD) field and before the PHR field (SP1 packet). In the case of SP configuration 2 (SP2), the STS field is located after the PHY payload (SP2 packet). In the case of SP configuration 3, the STS field is located right after the SFD field, and the PPDU does not include the PHR and the data field (PHY payload) (SP3 packet). That is, in the case of SP3, the frame (or UWB message) does not include the PHR and the PHY payload.

Meanwhile, when the STS packet configuration is supported, SP0, SP1, and SP3 may be configurations which should be mandatorily supported and SP2 may be an optionally supported configuration.

Figure 4:
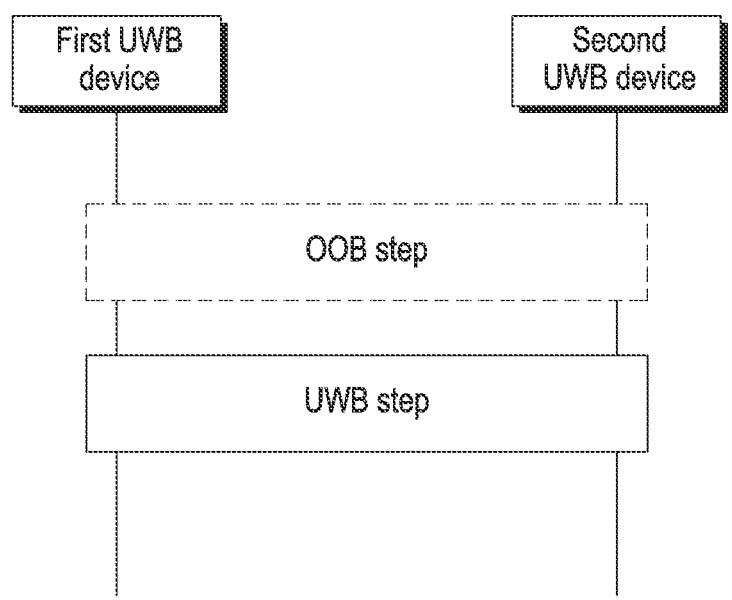
FIG. 4 illustrates a method by which two UWB devices perform UWB communication according to an embodiment of the disclosure.

FIG. 4 illustrates a method by which two UWB devices perform UWB communication according to an embodiment of the disclosure.

In an embodiment of FIG. 4, a first UWB device may serve as a controller (or controlee), and a second UWB may serve as a controlee (or controller) opposite to the first UWB device. Further, the first UWB device may serve as an initiator (or responder), and the second UWB device may serve as a responder (or initiator) opposite to the first UWB device.

(1) Referring to FIG. 4, the first UWB device and the second UWB device may optionally perform the OOB step before the UWB step. In the disclosure, the OOB step may be referred to as an OOB connection.

The OOB step may be a step performed to discover a UWB device through an OOB channel (for example, a BLE channel), and establish and control a UWB session.

In an embodiment of the disclosure, the OOB step may include at least one of the following steps.

A step of discovering a UWB device and a profile (device and profile discovery)

A step of establishing an OOB connection (channel)

A step of establishing a secure channel for securing messages and data

A step of exchanging parameters for establishing a UWB session (for example, a UWB capability parameter (controlee capability parameter), a UWB configuration parameter, and/or a session key-related parameter) through a secure channel (parameter exchange step)

In an embodiment of the disclosure, the parameter exchange step may include a step in which the controlee transmits a controlee capability parameter/message (UWB_CAPABILITY) to the controller, a step in which the controller transmits a UWB configuration parameter/message (UWB_CONFIGURATION) to the controlee, and/or a step in which one UWB device transmits a session key-related parameter/message (SESSION_KEY_INFO) for protecting a UWB session to another UWB device.

In an embodiment of the disclosure, the controlee (UWB) capability parameter and/or the session key parameter may be transmitted while being included in a controlee information message (CONTROLEE_INFO) which is an OOB message transmitted from the controlee to the controller. In an embodiment of the disclosure, the UWB configuration parameter and/or the session key parameter may be transmitted while being included in a session data message (SESSION_DATA) which is an OOB message transmitted from the controller to the controlee.

The controlee capability parameter (UWB_CAPABILITY) may include at least one parameter for providing information on the device capability of the controlee. For example, the controlee capability parameter may include a parameter for supporting the role of the device (initiator or responder), a parameter for supporting multiple nodes, a parameter for supporting an STS configuration, a parameter for supporting a ranging method, an RFFRAME feature capability parameter, a parameter for supporting an angle of arrival (AoA), and/or a parameter for supporting a scheduled mode.

The UWB configuration parameter (UWB_CONFIGURATION) may include at least one parameter used for configuring the UWB session. For example, the UWB configuration parameter may include a UWB session ID parameter, a ranging method parameter, a multi-node configuration parameter, an STS configuration parameter, a scheduled mode parameter, a time-of-flight (ToF) report parameter, an AoA-related parameter, a parameter indicating the number of slots for each ranging round, a slot duration parameter, a responder slot index parameter, a MAC address mode parameter, a device MAC address parameter, a parameter indicating the number of controlees, and/or a destination (DST) MAC address parameter.

The session key parameter (SESSION_KEY_INFO) may include a session key-related parameter for a dynamic STS and/or a session key-related parameter for a static STS. For example, the session key-related parameter for the dynamic STS may include data exchanged to generate a UWB session key or data directly used as a UWB session key. For example, the static STS may include an ID of a vendor (vendor ID) who is a provider of the UWB-enabled application and a predefined value (static STS IV) selected by the UWBO-enabled application for the UWB device. The vendor ID may be used to configure a parameter phyVupper64 for the static STS, and the static STS IV may be used to configure a parameter vUpper64.

(2) The first UWB device and the second UWB device may perform the UWB step. In the disclosure, the UWB step may be referred to as a UWB connection step.

The UWB step may be a step performed for UWB ranging through a UWB session and for transmitting service data.

In an embodiment of the disclosure, the UWB step may include at least one of the following steps.

A step of starting a UWB session (UWB trigger)

A step of performing UWB ranging for acquiring a distance/location between two UWB devices A step of exchanging service data (transaction)

Meanwhile, the OOB step is an optional step as described above and may be omitted according to an embodiment of the disclosure. For example, when the UWB device discovery and/or the UWB session configuration and control are performed through a UWB channel (in-band), the OOB step may be omitted. For example, when in-band discovery is performed, the OOB step for the OOB discovery may be omitted. The UWB step may further include an operation of discovering a UWB device through a UWB channel and exchanging a parameter for establishing a UWB session.

Figure 5:
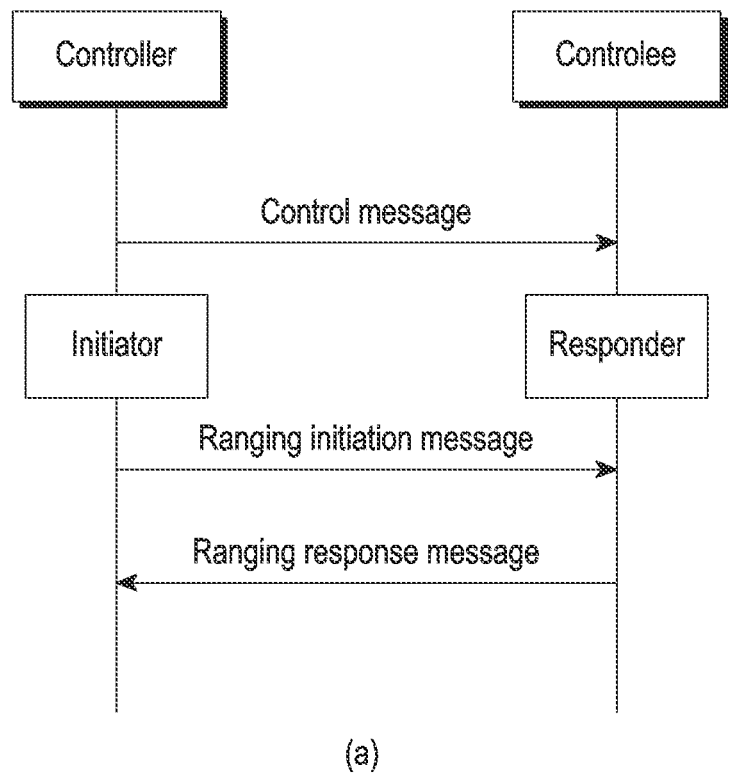
FIG. 5 illustrates a method by which two UWB devices perform UWB ranging according to an embodiment of the disclosure.
Figure 5:
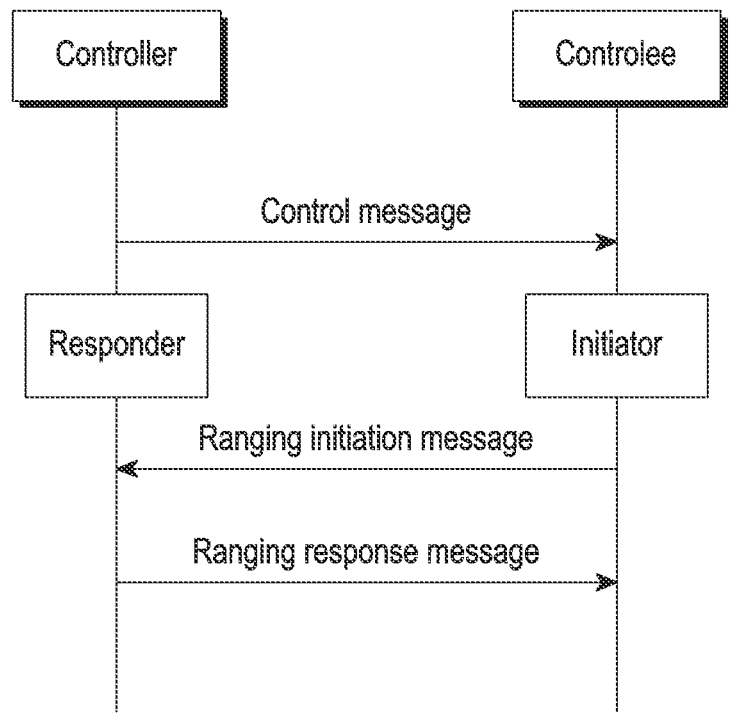

FIG. 5 illustrates a method by which two UWB devices perform UWB ranging according to an embodiment of the disclosure.

Part (a) of FIG. 5 illustrates an embodiment in which a first UWB device operates as a controller/initiator and a second UWB device operates as a controlee/responder, and part (b) of FIG. 5 illustrates an embodiment in which the first UWB device operates as a controller/responder and the second UWB device operates as a controlee/initiator.

Referring to FIG. 5, the controller may transmit a control message for UWB ranging to the controlee. The ranging control message may be used to carry ranging parameter(s) for controlling and configuring a ranging procedure. In an embodiment of the disclosure, the control message may include information on the role of the ranging device (for example, initiator or responder), ranging slot index information, and/or ranging device address information.

The initiator may transmit a ranging initiation message for initiating UWB ranging to the responder. In an embodiment of the disclosure, the initiator may transmit a ranging initiation message through SP1 packet or SP3 packet. When the ranging initiation message is transmitted through SP1 packet, the control message may be transmitted while being included in the PHY payload of the ranging initiation message. When the ranging initiation message is transmitted through SP3 packet, the ranging initiation message does not include the PHR and the PHY payload.

The responder may transmit a ranging response message to the initiator in response to the ranging initiation message. In an embodiment of the disclosure, the responder may transmit the ranging response message through SP1 packet or SP3 packet. When the ranging response message is transmitted through SP1 packet, a first measurement report message may be transmitted while being included in the PHY payload of the ranging response message. In an embodiment of the disclosure, the first measurement report message may include AoA measurement, a reply time measured by the responder, and/or a list of responder addresses and round-trip time measurement of the responders. A rely time field may indicate time difference between a reception time of the ranging initiation message and a transmission time of the ranging response message in an aspect of the responder. On the basis thereof, single-sided two-way ranging (SS-TWR) may be performed. Calculation of ToF through SS-TWR follows a scheme defined in IEEE 802.15.4z or FiRa.

In the case of double-sided two-way ranging (DS-TWR), the initiator may further transmit a ranging final message for completing ranging exchange to the responder. When the ranging final message is transmitted through SP1 packet, a second measurement report message may be transmitted while being included in the PHY payload of the ranging final message. In an embodiment of the disclosure, the second measurement report message may include AoA measurement, a round-trip time (first round-trip time) for a first responder, and/or a list of responder addresses and round-trip time measurement of the responders. When a transmitter of the measurement report message is the initiator, the first round-trip time field may indicate time difference between the ranging initiation message from the initiator and the first ranging response message from the first responder. Alternatively, when the transmitter of the measurement report message is the responder, the first round-trip time field may indicate time difference between the ranging response message from the responder and the ranging final message from the initiator. On the basis thereof, DS-TWR may be performed. Calculation of time-of-flight (ToF) through DS-TWR follows a scheme defined in IEEE 802.15.4z or FiRa.

Meanwhile, according to an embodiment of the disclosure, the first measurement report message and/or the second measurement report message may be transmitted through separate message without being included in the ranging response message and/or ranging final message. For example, when a non-deferred mode is applied, the measurement report message may be transmitted through a data frame after ranging exchange.

Meanwhile, the initiator and the responder may perform UWB ranging according to a predetermined schedule mode. For example, in the case of a time-scheduled ranging mode, the controller is aware of all controlee IDs and may designate accurate schedule of ranging transmission. In another example, in the case of a contention-based ranging mode, the controller is not aware of the number of controlees and IDs, and accordingly UWB devices compete with each other. Response devices may have collision therebetween.

Figure 6:
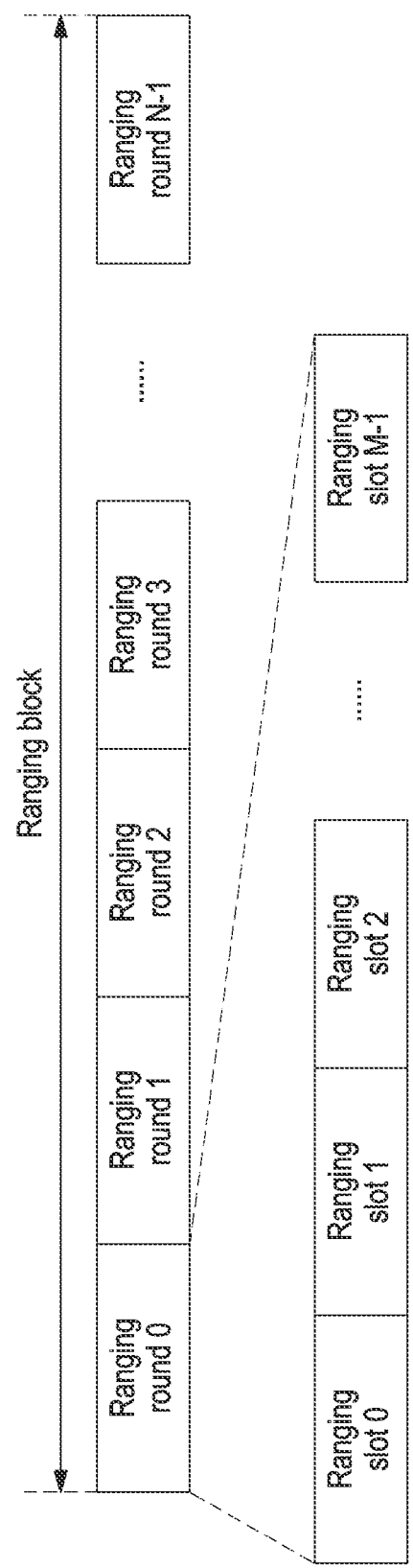
FIG. 6 illustrates the structure of ranging blocks and rounds used for UWB ranging according to an embodiment of the disclosure.

FIG. 6 illustrates the structure of ranging blocks and rounds used for UWB ranging according to an embodiment of the disclosure.

In the disclosure, the ranging block refers to a time period for ranging. The ranging round may be a period of sufficient duration for completing one entire range-measurement cycle in which a set of UWB devices participating in ranging exchange involves. A ranging slot may be a sufficient period for transmitting at least one ranging frame (RFRAME) (for example, ranging initiation/response/final message).

Referring to FIG. 6, one ranging block may include at least one ranging round, and each ranging round may include at least one ranging slot.

When the ranging mode is a block-based mode, a mean time between consecutive ranging rounds may be a constant. Alternatively, when the ranging mode is an interval-based mode, a time between consecutive ranging rounds may be dynamically changed. That is, the interval-based mode may adopt a time structure having adaptive spacing.

The number and duration of slots included in the ranging round may be changed between ranging rounds. This may be configured through a control message of the controller.

Figure 7:
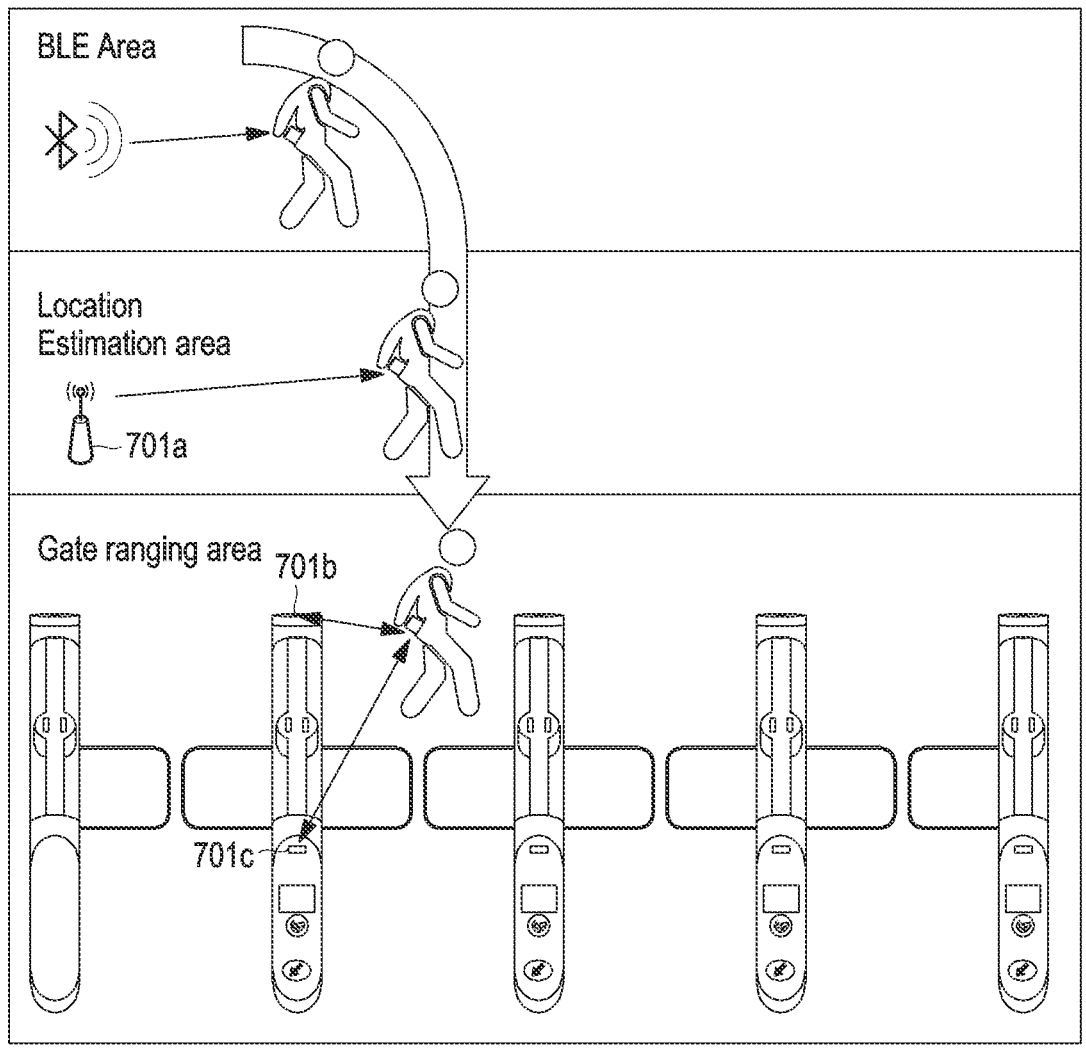
FIG. 7 illustrates a method of receiving location information of a user terminal according to an embodiment of the disclosure.

FIG. 7 illustrates a method of receiving location information of a user terminal according to an embodiment of the disclosure.

The disclosure relates to a method of, when a gate is passed through using a location of a user terminal, selecting a gate at which the user terminal may pay a toll. According to various embodiments of the disclosure, the user terminal may track a progress direction (or path) of the user by calculating the location of the user terminal measured in real time and angles between a plurality of pre-installed gates, select a gate to be passed through by the user terminal, determine whether the selected gate is passed through, select a specific gate at which authentication and payment is performed, and determine a time point at which the payment is cancelled.

Referring to FIG. 7, when the user terminal (or a user having the user terminal) enters a BLE area, the user terminal may receive a BLE advertising message (packet) from at least one BLE anchor. At least one BLE anchor may be located in the BLE area.

When the BLE advertising message is received, the user terminal may perform a prerequisite procedure. That is, a gate system service may be prepared. In an embodiment of the disclosure, the prerequisite procedure may be used to acquire authentication-related information and/or UWB-related information from the server.

When the user terminal enters a location estimation area, the user terminal may estimate its own location through a predetermined scheme in order to determine the closest gate through which the user terminal will pass. In an embodiment of the disclosure, the user terminal may receive a TDoA message from at least one D-TDoA anchor 701a through a UWB and estimate its own location through the D-TDoA scheme. At least one D-TDoA anchor may be located in the location estimation area. In another embodiment of the disclosure, the user terminal may estimate its own location by using a global positioning system (GPS).

Thereafter, the user terminal may select the closest gate. In an embodiment of the disclosure, a mobile device may select the closest gate on the basis of the location of gate(s) and the result of location estimation.

When the user terminal enters a gate ranging area, the user terminal may perform a procedure for UWB ranging based on DS-TW with the selected gate (anchor(s) of the gate) 701b and 701c. First, after selecting the closest gate, the user terminal may perform UWB ranging with the corresponding gate and perform a service protocol (for example, authentication or payment) with the corresponding gate on the basis thereof. After a message exchange procedure of the service protocol is normally completed, the user may pass through the gate.

Figure 8:
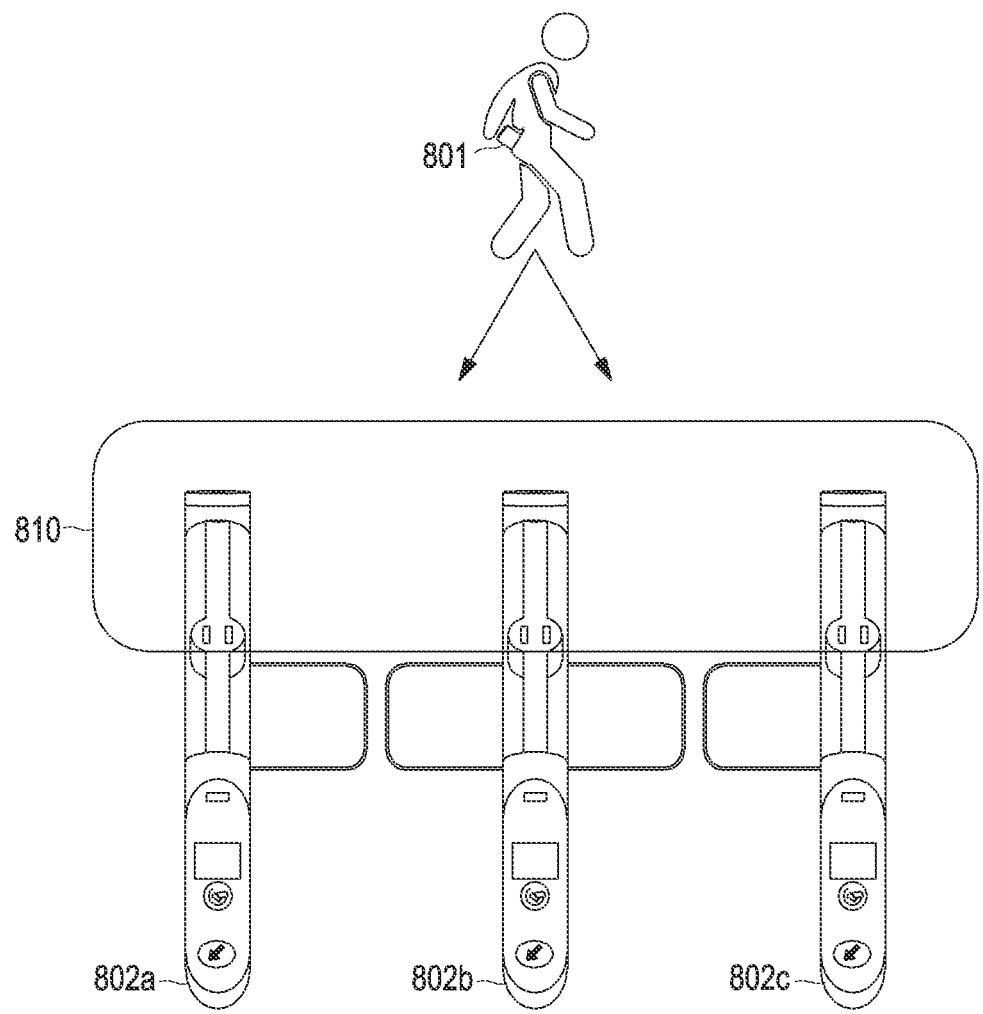
FIG. 8 illustrates determination matters required by the user terminal when the user terminal enters the gate according to an embodiment of the disclosure.

FIG. 8 illustrates determination matters required by the user terminal when the user terminal enters the gate according to an embodiment of the disclosure.

Referring to FIG. 8, according to a method proposed in the disclosure, when the user desires to pass through one gate among a plurality of gates 802a, 802b, and 802c in an embodiment 810, operations required by the user terminal may include at least one of the following operations.

Figure 9:
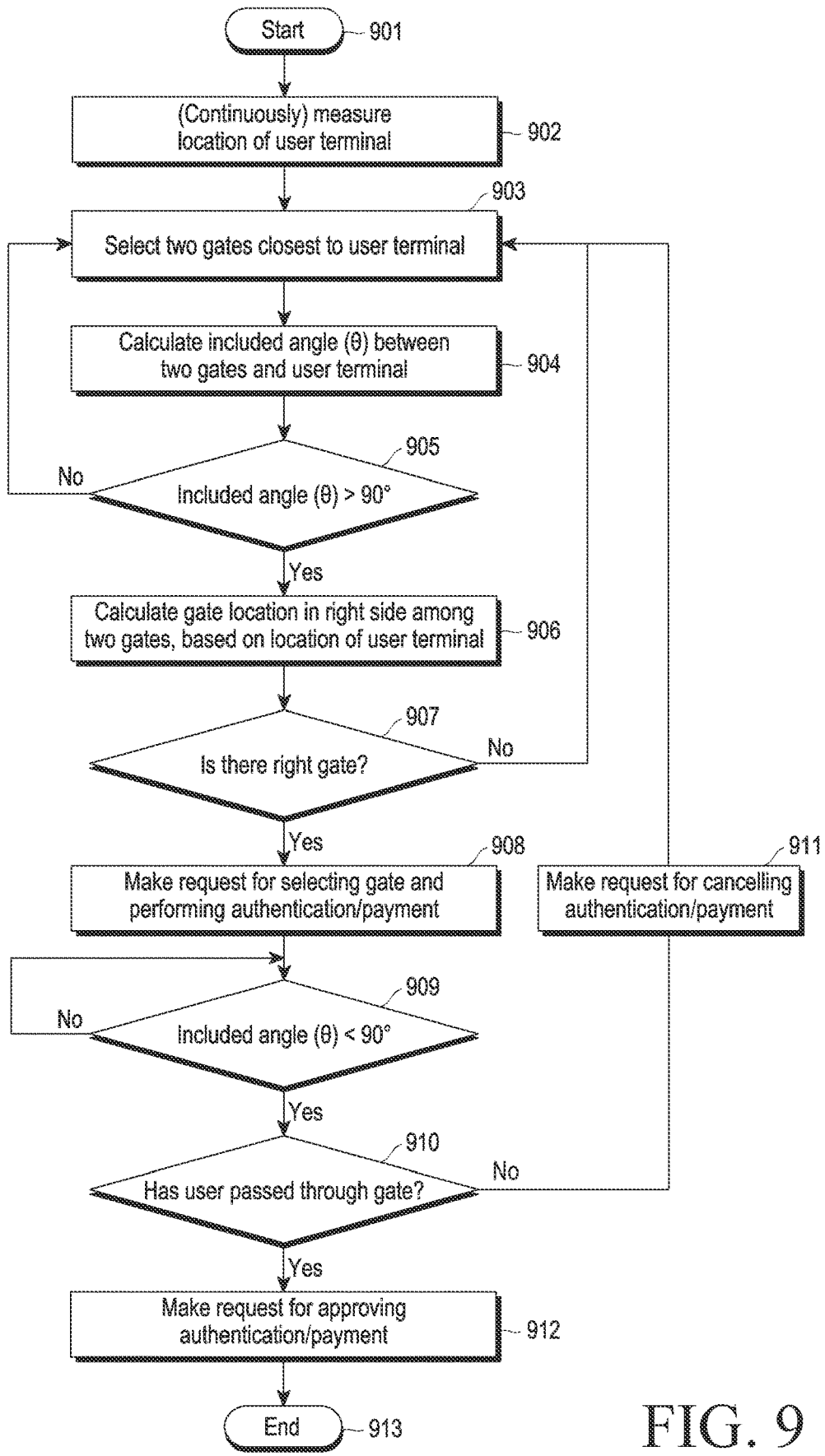
FIG. 9 illustrates an operation of a user terminal according to an embodiment of the disclosure.

An operation of recognizing gates between which the user enters among a plurality of gates An operation of recognizing one gate among two gates with which radio access should be performed An operation of determining whether the user has passed between two gates and determining whether authentication and payment should be cancelled like in a situation in which the user changes a path and enters another gate or enters a gate and then turns back FIG. 9 illustrates an operation of a user terminal according to an embodiment of the disclosure.

According to a method proposed in the disclosure, the user terminal may determine a gate which the user terminal will enter after getting off the subway (operations 901 to 905).

According to an embodiment of the disclosure, when the user faces a plurality of gates, Bluetooth or UWB may be used as a method of communicating with the terminal in order to transmit information on the location of the user terminal. The user terminal may receive a Bluetooth broadcasting message (for example, a BLE advertising message) or receive its own location coordinates from an anchor 701a, 701b, or 701c through a UWB chip. The information on the current location of the user terminal may be measured in real time in operation 902, and information on the location (or coordinates) of the gate may be information which the user knows as a predetermined value.

Referring to FIG. 9, the user terminal may prepare selection of a gate which the user terminal will pass through. By calculating the received location information of the user terminal and pre-received locations of a plurality of gates, the user terminal may select two gates close to itself in operation 903. The user terminal may calculate an included angle on the basis of the coordinates of two selected gates and real time location information of the user terminal. The included angle may have a value smaller than about 90 degrees when the user terminal is far away from the two gates and approach about 90 degrees as the user terminal becomes closer. Further, as the user terminal is closer, the included angle exceeds about 90 degrees. It may be determined that the user terminal passes between the selected two gates when the included angle exceeds 90 degrees, and determined that the user terminal does not pass between the selected two gates or has already passed when the included angle is lower than 90 degrees. Accordingly, the user terminal may recognize that the user terminal is moving between the selected two gates when the included angle exceeds about 90 degrees in operation 905, and the case in which the included angle is lower than about 90 degrees means that the user terminal does not approach the space between the selected two gates and thus it is required to newly select gates close to the user terminal in operation 903. The terminal may receive information on its own location without making a request to the server in real time.

Referring to FIG. 9, after determining that the selected two gates are gates corresponding to its own path of entry, the user terminal may select a specific gate at which authentication and payment will be performed from among the two gates. According to an embodiment of the disclosure, when the included angle between the two gates and the user terminal exceeds 90 degrees in operation 905, a location of a gate to perform radio access among the two gates may be calculated based on the user terminal in operation 906. In an example of a subway gate, authentication and payment are performed by a right gate in an entry direction, and thus the user terminal may identify which gate of the two gates is located in the right in operation 906. When it is determined that the gate exists in the right in operation 907, the user terminal may select the right gate and make a request for performing authentication for payment or performing payment in operation 908. When there are changes like a situation in which there is no gate in the right, no right gate is found, or a gate located in the right is calculated but the user terminal returns back, the user may return to an operation 903 of selecting the gate close to the user terminal. The user terminal may receive information on the location from at least one anchor in real time during movement. When the included angle between the user terminal and the two gates is lower than about 90 degrees in operation 909, it may be noted that the distance between the two gates and the user terminal is farther and recognized that the user terminal has passed through the gate in operation 910. Even when the included angle between the user terminal and the two gates is lower than about 90 degrees in operation 909, the user may return back rather than having passed through the gate in operation 910. When the user terminal has performed authentication and payment, the user terminal may make a request for cancel in operation 911. When the user terminal makes a request for cancelling authentication and payment in operation 911, the user terminal may select again two gates close to the user terminal in operation 903 and return to calculating the included angle between the two gates and the user terminal in operation 904. The user terminal selecting new two gates may determine whether the included angle exceeds about 90 degrees in operation 905, calculate a gate to perform authentication and payment among the two gates in operation 907, select the calculated gate, and make a request for authentication and payment in operation 908.

Referring to FIG. 9, the user terminal may make a request for authentication and payment, identify whether the user has passed through the two gates, and then make a request for approving the authentication and the payment in operation 912.

Figure 10:
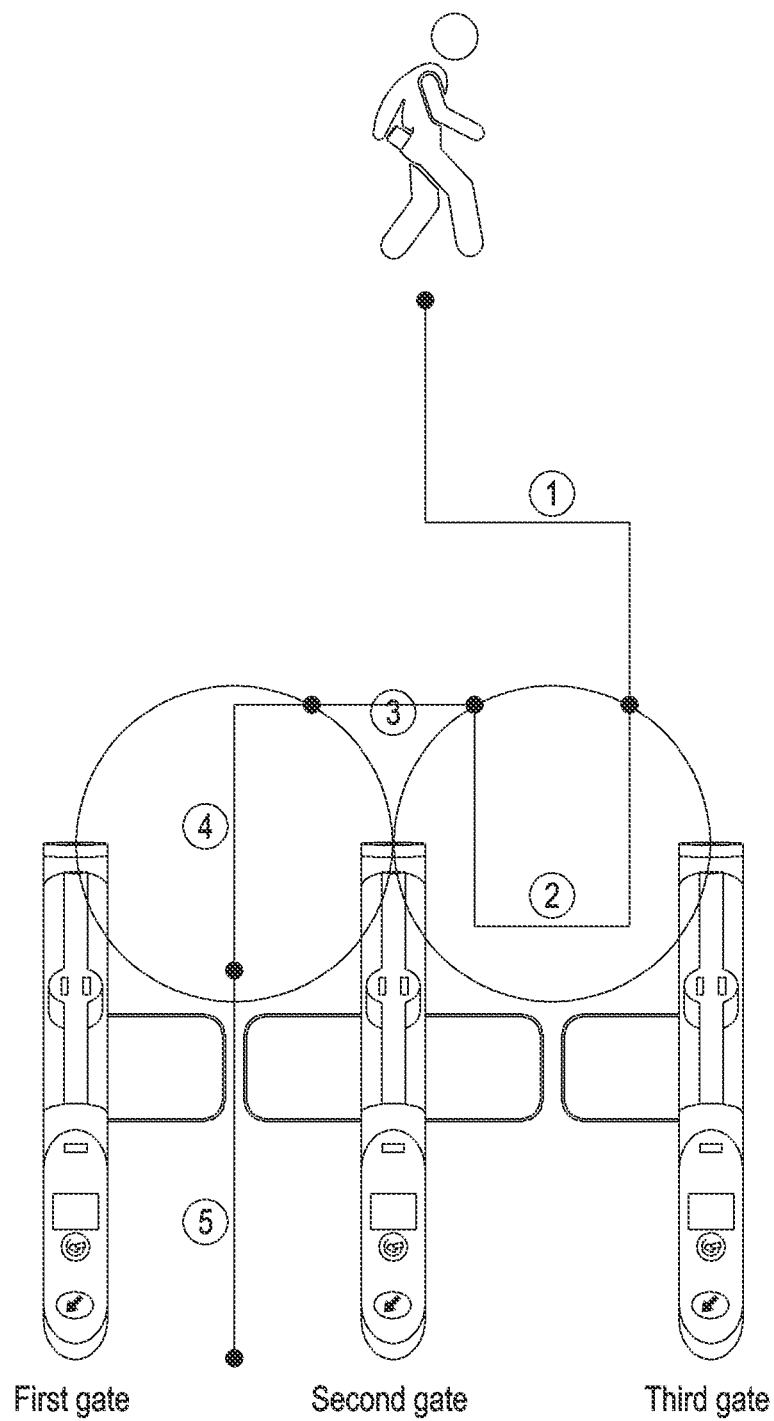
FIG. 10 illustrates a movement path of a user according to an embodiment of the disclosure.

FIG. 10 illustrates a movement path of a user according to an embodiment of the disclosure.

Referring to FIG. 10, the user terminal may select, for example, a second gate and a third gate, move in a direction of ①, select the second gate located in the right at ②, and perform radio access. When the user changes a progress path and returns along a path of ③, the user terminal may cancel the authentication and payment request and search for new two gates. At ④, the user terminal may select a first gate and the second gate as gates to be passed through, pay a fare through the first gate, and pass between the two gates. As the included angle between the first gate and the second gate, and the user terminal decreases to about 90 degrees or lower according to movement in a direction of ⑤, the user terminal may determine that the user has passed between the gates and finally approve authentication and payment.

Figure 11A:
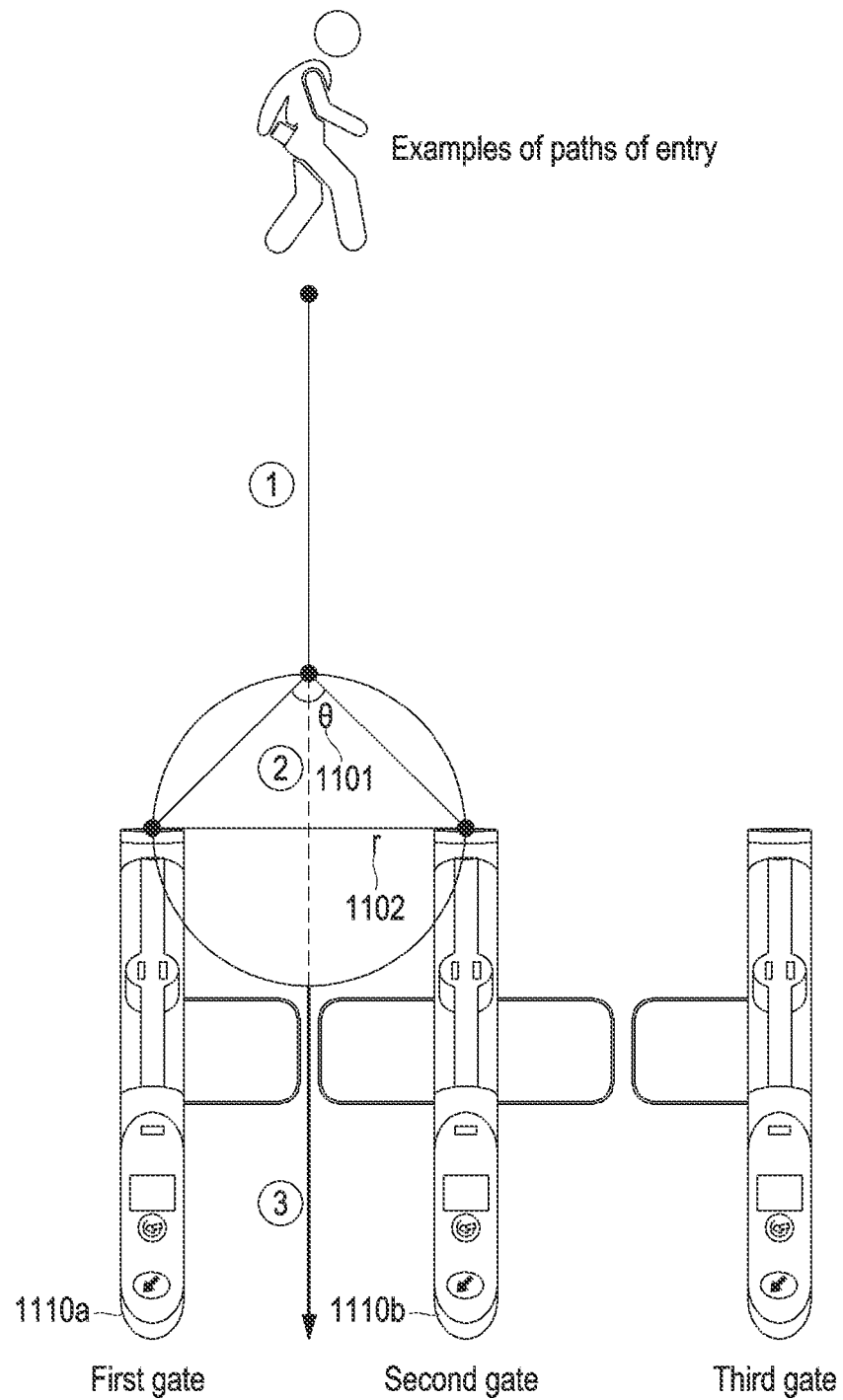
FIG. 11A illustrates a change in an included angle due to entry of a user according to an embodiment of the disclosure.
Figure 11B:
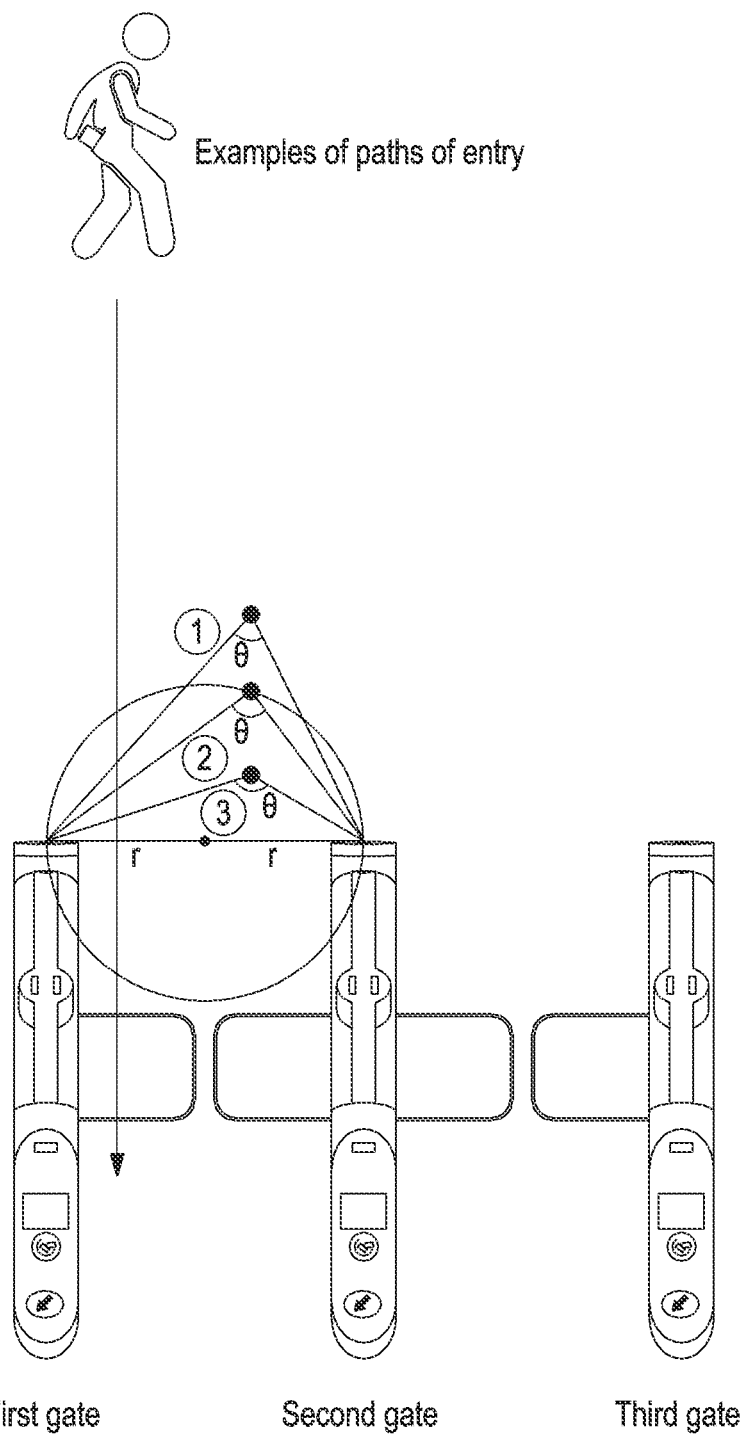
FIG. 11B illustrates a change in an included angle due to entry of a user according to an embodiment of the disclosure.

FIG. 11A illustrates a change in an included angle due to entry of a user according to an embodiment of the disclosure, FIG. 11B illustrates a change in an included angle due to entry of a user according to an embodiment of the disclosure.

According to an embodiment of the disclosure, the user terminal may use a second low of cosines for calculating an included angle between the user terminal and two gates.

Referring to FIG. 11A, when the terminal is located in a path in section ①, the included angle between the terminal and two gates may be lower than about 90 degrees. When the user terminal approaches the gates and enters section ②, an area having an included angle 1101 between the two gates and the user terminal is 90 degrees may be a circle having a radius 1102 of r. A diameter (2r) may be a distance between a first gate 1110*a* and a second gate 1110*b*. When the measured location of the user terminal is (x, y) on the basis of the assumption that the location of the first gate 1110*a* is (0−r, 0) (r being the half of the distance between the gates) and the location of the second gate 1110*b* is (0+r, 0) (r being the half of the distance between the gates), a cosine value for the included angle (Θ) may be calculated using the second low of cosine corresponding to Equation 1. The section ② may form an area in which the included angle between the first gate 1110*a* and the second gate 1110*b*, and the user terminal is higher than or equal to about 90 degrees. In section ③, the included angle (Θ) is lower than about 90 degrees, and thus the it may be considered that the user has passed between the first gate and the second gate.

$$\text{If } \cos_L \Theta = \left(\frac{b^2 + c^2 - a^2}{2bc}\right), \quad \text{Equation 1}$$

$$a = 2r, b = \sqrt{(r-x)^2 + y^2}, \text{ and } c = \sqrt{(r+x)^2 + y^2},$$

$$\cos_L \Theta = \left(\frac{(r-x)^2 + y^2 + (r+x)^2 + y^2 - 4r^2}{\sqrt{(r+x)^2(r-x)^2 + y^2((r+x)^2 + (r-x)^2) + y^4}}\right)$$

Referring to FIG. 11B, when the user enters a plurality of gates, an included angle may gradually increase such as ① acute angle, ② right angle, and ③ obtuse angle. By connecting locations of the terminal at which the included angle is the right angle, a circle area having a radius of r may be formed. For example, a service for authentication and payment may be initiated under a condition in which the user terminal enters the circle area having the radius of r. Alternatively, a time point at which the user terminal escapes the circle area having the radius of after the service for authentication and payment is initiated may be a time point at which a request for approving authentication and payment is made.

Figure 12:
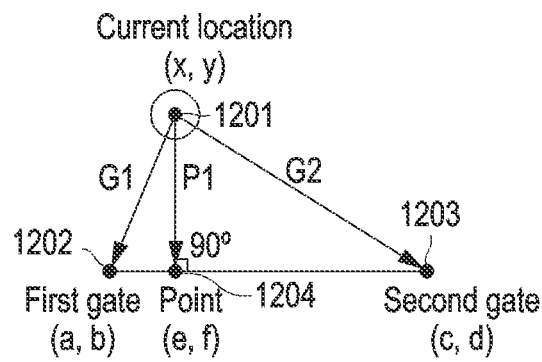
FIG. 12 schematizes locations of a user terminal and gates in the form of vectors according to an embodiment of the disclosure.

FIG. 12 schematizes locations of a user terminal and gates in the form of vectors according to an embodiment of the disclosure.

Figure 13:
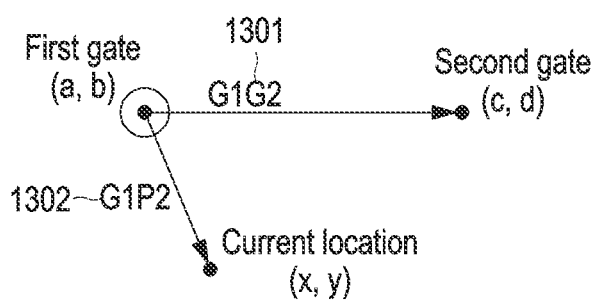
FIG. 13 schematizes locations of a user terminal and gates in the form of vectors according to an embodiment of the disclosure.

FIG. 13 schematizes locations of a user terminal and gates in the form of vectors according to an embodiment of the disclosure.

According to an embodiment of the disclosure, the user terminal may select one gate to perform authentication. In general, the user terminal may perform authentication and payment with a gate in the light among two gates. One gate selected by the user terminal may be a right (or left) gate through a rotation angle of vectors.

Referring to FIG. 12, the current location 1201 of the user terminal may be expressed as (x, y), and information on the current location 1201 may be measured in real time and received without any request from the user terminal. Information on locations of a first gate 1202 and a second gate 1203 may be received in advance by the user terminal. The user terminal may move in a direction from the current location 1201 to a point 1204, and a vector from the current location 1201 to the point 1204 is a perpendicular vector and may be perpendicular to the side formed by the first gate and the second gate. A vector G1 from the current location to the first gate may be (a-x, b-y), a vector G2 from the current location 1201 to the second gate 1203 may be (c-x, d-y), and a perpendicular vector (P1) from the current location to the point 1204 may be (e-x, f-y). Through the use of a vector rotation angle calculation equation, rotation angles (Θ) between the vectors P1 and G1 and vectors P1 and G2 may be calculated. It may be noted that v1→v2 is a counterclockwise direction when θ is + and is a clockwise direction when θ is − by calculating an angle between v1=(x1, y1) and v2=(x2, y2) and a direction of each angle (clockwise direction or counterclockwise direction) in a two-dimensional surface on the basis of Equation 2 corresponding to a vector rotation angle calculation equation.

$$\sin \angle \Theta = \left( \frac{x_1 y_1 - x_2 y_2}{\|V_1\| - \|V_2\|} \right)$$

Equation 2

Referring to FIG. 12, when G1=(x$_1$, y$_1$) and P1=(x$_2$, y$_2$), a left gate in a progress direction may be recognized when sin ∠Θ is a positive number (+) on the basis of the vector rotation angle calculation equation $$\sin \angle \Theta = \left( \frac{x_1 y_1 - x_2 y_2}{\|G_1\| \cdot \|P_2\|} \right),$$

and a right gate may be recognized when the sin ∠Θ is a negative number. Accordingly, the user terminal may select one of the two gates and perform authentication and payment with the right or left gate.

According to an embodiment of the disclosure, the user terminal may determine whether the user has passed between the two gates. The user terminal may distinguish the location of the user from an area identified as the gate in order to identify whether the user has passed the gate. After selecting one gate to perform authentication or payment, the user terminal needs to identify whether the user has passed between the gates.

Referring to FIG. 13, for example, a vector G1G2 1301 from the first gate identified as the right gate to the second gate may be (c-a, d-b), and a vector G1P2 1302 from the first gate to the current location may be (a-x, b-y). A rotation angle between G1G2 1301 and G1P2 1302 may be calculated using the vector rotation angle calculation equation. The left side may be determined when sin ∠Θ is a positive number (+) and the right side may be determined when sin ∠Θ is a negative number (−). For example, the user has passed through the gates when the user location is the right side from the vector G1G2 1301 from the first gate to the second gate, and it may be recognized that the user has not passed the gates when the user location is the left side. The user terminal may determine whether the user has not passed between the first gate and the second gate or the user has passed between the first gate and the second gate and thus perform authentication and payment on the basis of information on its own current location and the rotation angle calculation equation.

Figure 14:
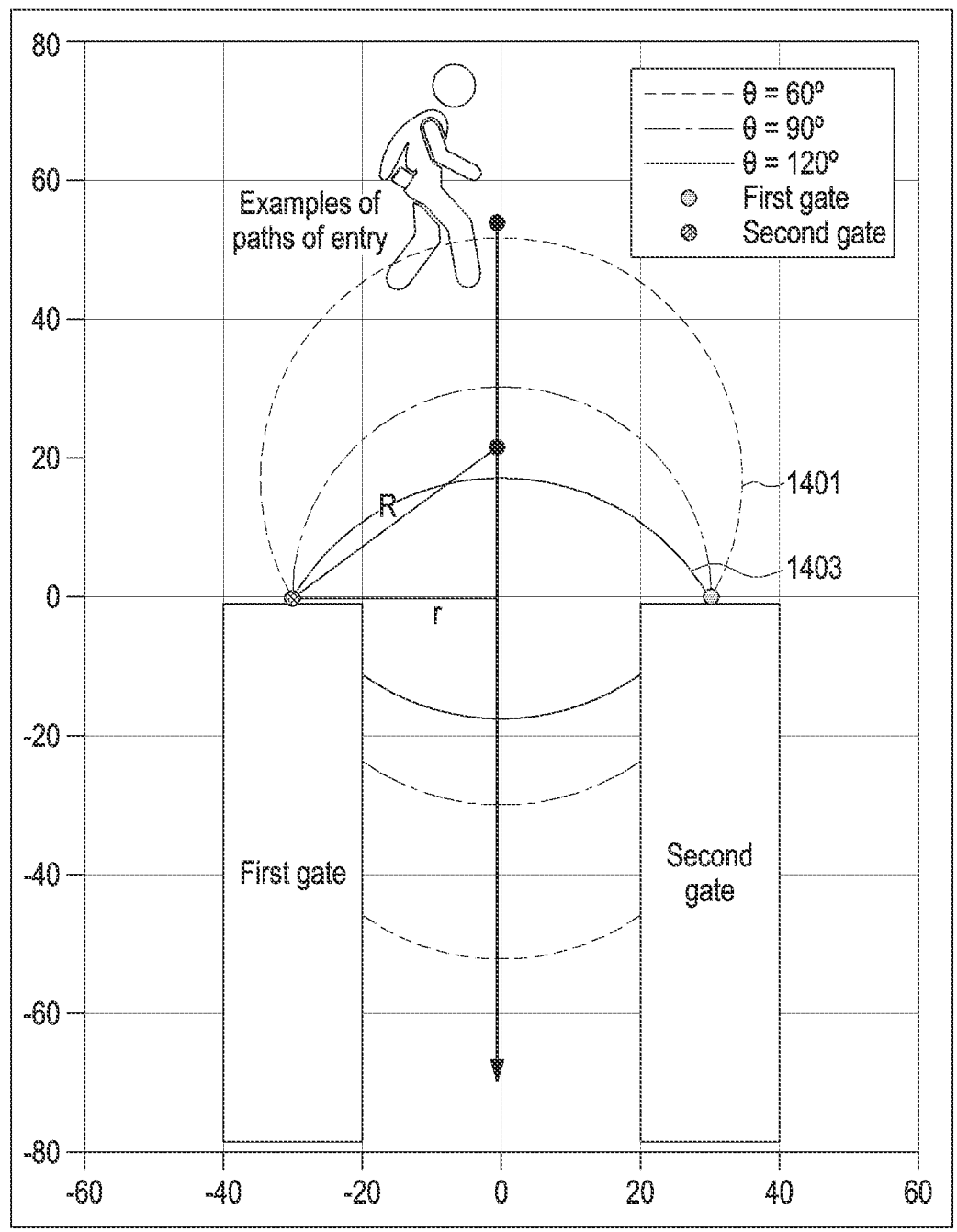
FIG. 14 illustrates an access area formed according to a set angle according to an embodiment of the disclosure.

FIG. 14 illustrates an access area formed according to a set angle according to an embodiment of the disclosure.

According to an embodiment of the disclosure, the location at which an included angle between the user terminal and two gates is the right angle may be a circle having a radius of r corresponding to the half of the distance between the two gates, and when the user terminal enters an area in which the included angle is an obtuse angle, may initiate a service for authentication and payment. In the case in which the distance between the first gate and the second gate is about 60 cm, when it is assumed that r is about 30 cm and 2r is about 60 cm, it may be recognized that the user terminal is far away from the gates if the included range (θ) is about 90 degrees or lower (for example, the user terminal is located father from the center of the two gates by a distance longer than the radius r that is about 30 cm). When the included angle (θ) is about 90 degrees (for example, the user terminal is located within a distance of 30 cm from the center of the two gates), it may be recognized that the user terminal is located in a circle area having the center that is the center of the two gates. When the included angle (θ) exceeds about 90 degrees (for example, the user terminal is located within a distance shorter than 30 cm from the center of the two gates), it may be recognized that the user terminal is located close to the gates.

According to various embodiments of the disclosure, a designer may configure an included angle (θ) and a distance (r) between the two gates to configure a range of an area (geofence) for gate access. For example, a time point at which the user terminal selects two gates is designated as an area through a coordinate range. For example, when the user terminal forms an included angle corresponding to an angle other than 90 degrees with the two gates, the user terminal may select one gate to perform authentication and payment.

Referring to FIG. 14, the range of geofence for gate access may be designated for each included angle. For example, the area (geofence) for each included angle may mean that the inside of a figure drawn by the included angle based on the location of gates is an area which is a condition by which the terminal may access the gates. By controlling the included angle, the user terminal may configure an area in which the user terminal may search for gates and access the gates. For example, the range of the geofence is narrower as the included angle is larger and the range of the geofence is wider as the included angle is smaller. In the expanding of the area (geofence), the range having smaller interference to a neighboring area (geofence) may be configured. For example, in comparison between the case in which the included angle is configured as about 60 degrees and an area 1401 formed by locations having an angle between the two gates and the user terminal is about 60 degrees and the case in which the included angle is configured as about 120 degrees and an area 1403 formed by locations having an angle between the two gates and the user terminal is about 120 degrees, the entry area of the user area may become wider as the included angle is smaller.

Figure 15A:
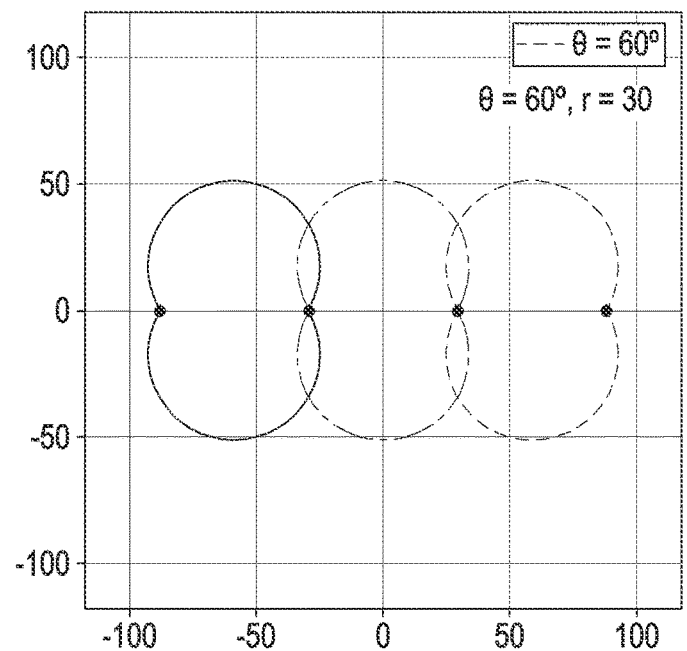
FIG. 15A illustrates areas formed by a plurality of gates according to an embodiment of the disclosure.

FIG. 15A illustrates areas formed by a plurality of gates according to an embodiment of the disclosure.

Figure 15B:
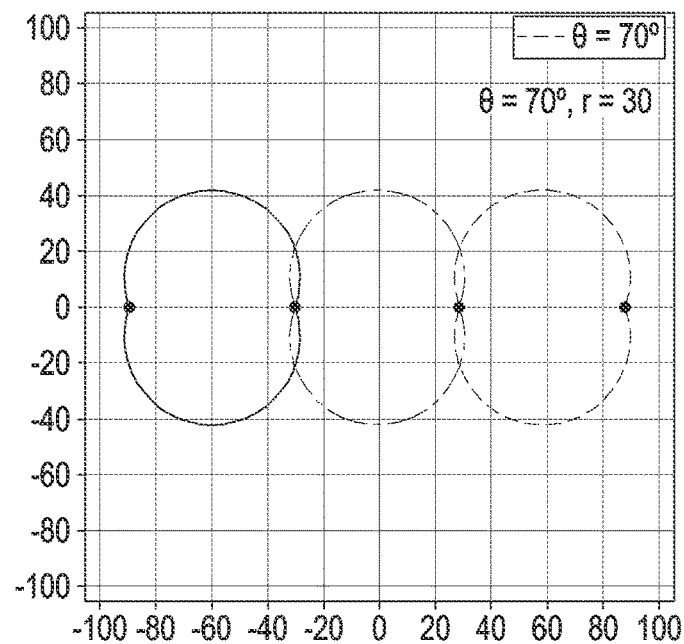
FIG. 15B illustrates areas formed by a plurality of gates according to an embodiment of the disclosure.

FIG. 15B illustrates areas formed by a plurality of gates according to an embodiment of the disclosure.

Figure 15C:
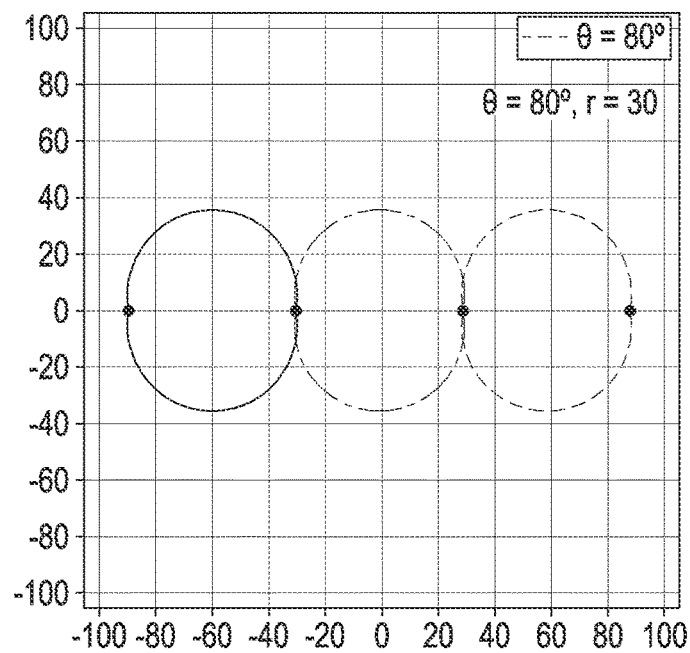
FIG. 15C illustrates areas formed by a plurality of gates according to an embodiment of the disclosure.

FIG. 15C illustrates areas formed by a plurality of gates according to an embodiment of the disclosure.

Figure 15D:
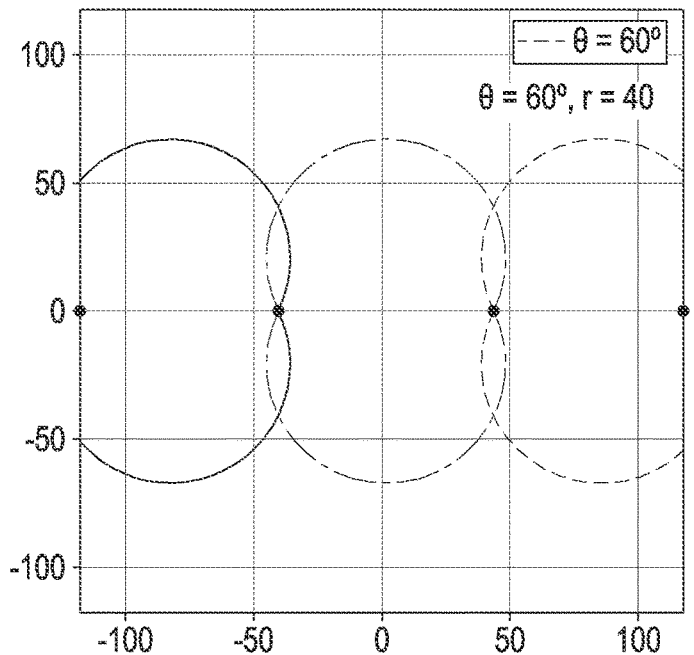
FIG. 15D illustrates areas formed by a plurality of gates according to an embodiment of the disclosure.

FIG. 15D illustrates areas formed by a plurality of gates according to an embodiment of the disclosure.

Figure 15E:
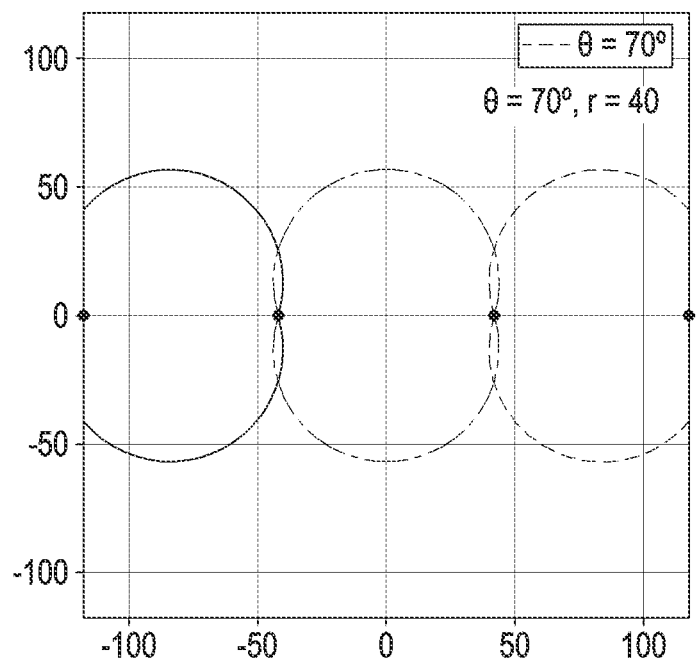
FIG. 15E illustrates areas formed by a plurality of gates according to an embodiment of the disclosure.

FIG. 15E illustrates areas formed by a plurality of gates according to an embodiment of the disclosure.

Figure 15F:
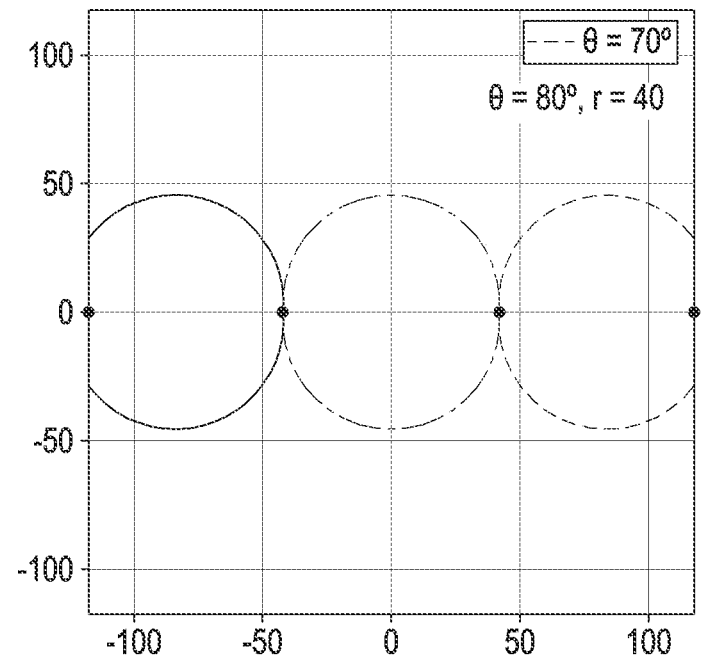
FIG. 15F illustrates areas formed by a plurality of gates according to an embodiment of the disclosure.

FIG. 15F illustrates areas formed by a plurality of gates according to an embodiment of the disclosure.

According to an embodiment of the disclosure, when the number of gates is n, a relation equation between a geofence range in which the user terminal may search for and access gates and an included angle may be identified. Further, by calculating an area in which a plurality of geofences may be interfered and controlling the included angle, the geofence which a designer desires may be configured. For example, when the included angle is configured as about 60 degrees, an area 1501 formed by locations having the included angle of about 60 degrees between the two gates and the user terminal may form a circle having the center of (0, y). When each of the first gate and the second gate is spaced apart from (0, 0) by about r, y of the center (0, y) and a radius R of an area 1501 formed by locations having an included angle of about 60 degrees may be calculated through the sine function. Coordinates of the center (0, y) may be identified along with the radius R.

$$y = \sqrt{\frac{r^2}{(\sin\angle\Theta)^2} - r^2} \quad \text{Equation 3}$$

$$R = \frac{r}{\sin\angle\Theta} \quad \text{Equation 4}$$

When the number of gates is n, it is possible to control a geofence range in which the user terminal may search for and access gates and an interference level by controlling the included angle on the basis of the above equation.

Referring to FIGS. 15A to 15F, it is possible to control an interference area with a neighboring geofence by controlling the included angle and a half value r of the distance between the gates.

An implementation form of the disclosure may be applied to various embodiment of the disclosure such as not only the case in which a fare is approved/paid when the user passes through the gates of the subway but also the case in which the door opens when the user approaches through automatic communication between the UWB of the user terminal and the lock of the front door.

Figure 16:
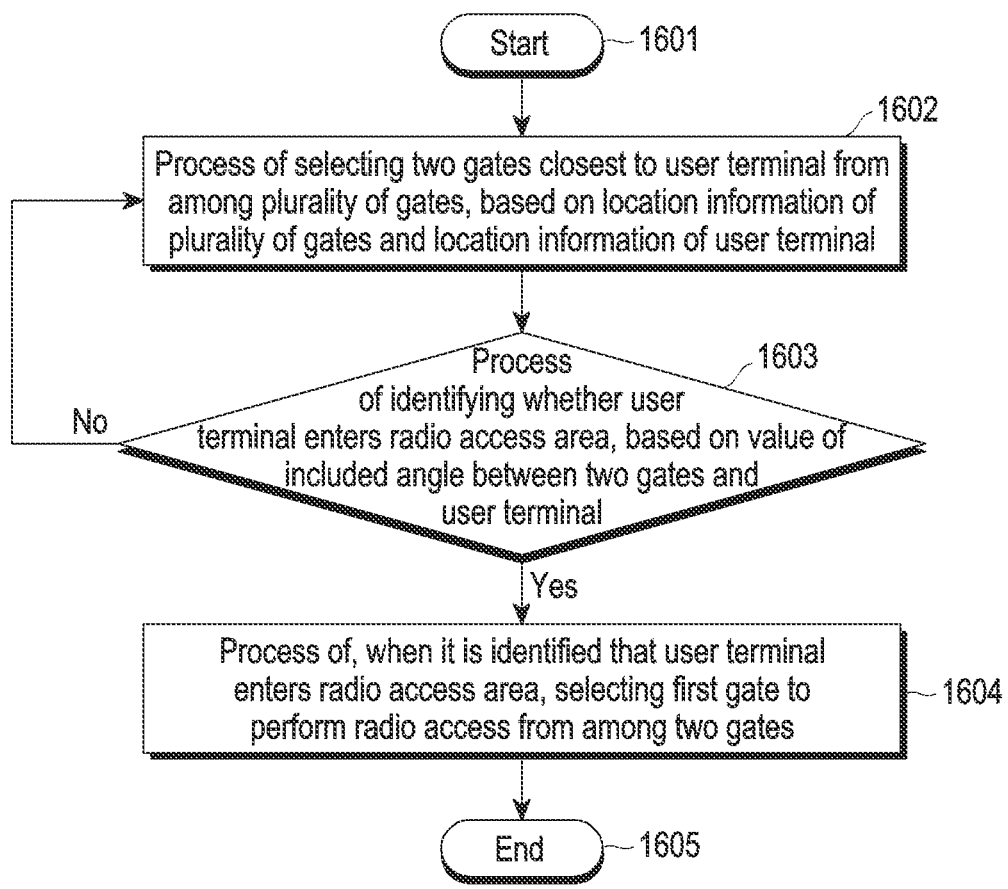
FIG. 16 illustrates an operation of a user terminal according to an embodiment of the disclosure.

FIG. 16 illustrates an operation of a user terminal according to an embodiment of the disclosure.

Figure 17:
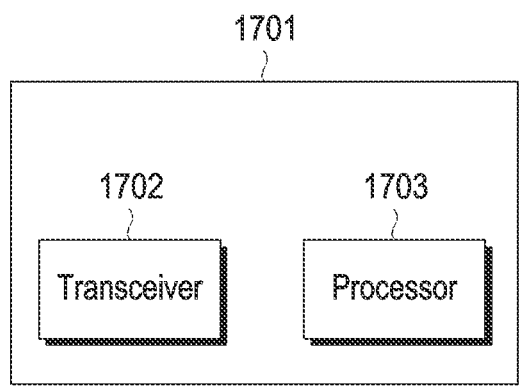
FIG. 17 illustrates a user terminal device according to an embodiment of the disclosure.

FIG. 17 illustrates a user terminal device according to an embodiment of the disclosure.

Referring to FIG. 16, in the disclosure, the user terminal may select two gates closest to the user terminal among a plurality of gates on the basis of location information of the plurality of gates and location information of the user terminal in operation 1602.

In the disclosure, the user terminal may identify whether the user terminal enters a payment area on the basis of a value of a first included angle between two gates and the user terminal in operation 1603. When it is determined that the user terminal does not enter the payment area, the user terminal returns operation 1602 of selecting two gates again. The payment area may be formed in the same way as the geofence in which the user terminal may search for an access gates. For example, when the first included angle is configured as a value having a specific angle, it may be identified that the user terminal enters the payment area if the first included angle exceeds the specific angle.

In the disclosure, when it is identified that the user terminal enters the payment area, the user terminal may select a first gate to perform authentication or payment among the two gates and transmit a request for authentication or payment for the first gate in operation 1604. The first gate may be, for example, a gate located in a right direction.

In the disclosure, it may be identified whether the user terminal has passed the gates on the basis of a value of a second included angle between the gates and the user terminal in operation 1605. The second included angle may be a value calculated in real time by documents measured after the user terminal has passed the gates. When the second included angle is configured as a specific angle, it may be identified that the user terminal has passed between the two gates if the second included angle has a value smaller than the specific angle.

In the disclosure, when it is identified that the user terminal has passed the gates, the user terminal may transmit a request for approving authentication or payment or a request for canceling authentication or payment to the selected first gate in operation 1606.

Referring to FIG. 17, in the disclosure, a user terminal 1701 may include a transceiver 1702 and a processor 1703. The user terminal may perform operations initiated in FIGS. 7 to 16 through the transceiver 1702 and the processor 1703.

In the disclosure, in connection with the real time positioning operation of the user terminal, for example, BLE may first identify a target to communication before the operation of the UWB, and then identify a counterpart and, within a predetermined area, perform UWB communication. The UWB communication may open doors and operate security, authentication and a payment system when a proximity distance between the UWB and the gates is recognized after synchronization between two sides is configured.

According to the disclosure, it may be preferable to use a UWB position method that is a more accurate position method than BLE. When Bluetooth is used, the location of the user terminal may be measured by the user terminal and a plurality of beacons installed in an environment around the user terminal. A method of performing a payment process using a boundary of a signal intensity by a plurality of beacons may be performed. However, determination of the boundary through the signal intensity may have difficulty in selecting or maintaining the desired shape and size. The disclosure has an advantage of calculating an angle between the user location and gates and expecting the excellent capability regardless of neighboring radio frequency (RF) signals in order to perform payment request, approval, and cancel at the accurate location when paying of a fare is performed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a user terminal, the method comprising:
   selecting two gates from among a plurality of gates, based on location information of the plurality of gates and location information of the user terminal;
   identifying whether the user terminal enters a radio access area, based on a value of an included angle between the two gates and the user terminal;
   in response to the user terminal being in the radio access area, selecting a first gate to perform radio access from among the two gates; and
   transmitting, to the first gate, a first request or a second request based on identification of whether the user terminal has passed the two gates,
   wherein the first request is for approving authentication or payment, and the second request is for cancelling the authentication or the payment.

2. The method of claim 1, further comprising:
   transmitting a request for radio access to the first gate; and
   identifying whether the user terminal has passed the two gates, based on the value of the included angle between the two gates and the user terminal.

3. The method of claim 2, wherein the identifying of whether the user terminal has passed through the two gates comprises identifying a rotation angle between a vector from the first gate to the user terminal and a vector from the first gate to the other one of the two gates.

4. The method of claim 2,
   wherein it is identified that the user terminal has not passed the two gates in response to the included angle being larger than or equal to a specific value, and
   wherein it is identified that the user terminal has passed the two gates in response to the included angle being smaller than the specific value.

5. The method of claim 1,
   wherein the location information of the user terminal is measured in real time, and
   wherein the location information of the user terminal is periodically received.

6. The method of claim 1, wherein the included angle is calculated in real time while the user terminal passes the two gates after the user terminal selects the two gates.

7. The method of claim 1, wherein the identifying of whether the user terminal enters the radio access area comprises identifying whether the included angle is larger than or equal to a specific angle.

8. The method of claim 1, wherein, in response to the user terminal not being in the radio access area, the selection of the two gates from among the plurality of gates is repeated.

9. The method of claim 1, wherein the first gate is selected by calculating a rotation angle between a perpendicular vector corresponding to a progress direction of the user terminal in a triangle formed by the user terminal and the two gates and a vector formed by the user terminal and one gate.

10. A user terminal comprising:
    a transceiver; and
    at least one processor,
    wherein the at least one processor is configured to:
       select two gates from among a plurality of gates, based on location information of the plurality of gates and location information of the user terminal,
       identify whether the user terminal enters a radio access area, based on a value of an included angle between the two gates and the user terminal,
       in response to the user terminal being in the radio access area, select a first gate to perform radio access from among the two gates, and
       transmit, to the first gate, a first request or a second request based on identification of whether the user terminal has passed the two gates,
       wherein the first request is for approving authentication or payment, and the second request is for cancelling the authentication or the payment.

11. The user terminal of claim 10, wherein the at least one processor is further configured to:
    transmit a request for radio access to the first gate through the transceiver, and
    identify whether the user terminal has passed the two gates, based on the value of the included angle between the two gates and the user terminal.

12. The user terminal of claim 10,
    wherein the location information of the user terminal is measured in real time, and
    wherein the at least one processor is further configured to periodically receive the location information of the user terminal through the transceiver.

13. The user terminal of claim 10, wherein the at least one processor is further configured to calculate the included angle in real time while the user terminal passes the two gates after the user terminal selects the two gates.

14. The user terminal of claim 10, wherein the at least one processor is further configured to identify whether the user terminal enters the radio access area according to whether the included angle is larger than or equal to a specific angle.

15. The user terminal of claim 10, wherein the at least one processor is further configured to:
    identify that the user terminal has not entered the radio access area, and
    repeat the selection of the two gates from among the plurality of gates.

16. The user terminal of claim 10, wherein the first gate is selected by calculating a rotation angle between a perpendicular vector corresponding to a progress direction of the user terminal in a triangle formed by the user terminal and the two gates and a vector formed by the user terminal and one gate.

17. The user terminal of claim 10, wherein the at least one processor is further configured to identify whether the user terminal has passed through the two gates according to a rotation angle between a vector from the first gate to the user terminal and a vector from the first gate to the other one of the two gates.

18. The user terminal of claim 11, wherein the at least one processor is further configured to:
    identify that the user terminal has not passed the two gates when the included angle is larger than or equal to a specific value, and
    identify that the user terminal has passed the two gates when the included angle is smaller than the specific value.

19. The user terminal of claim 10, wherein the location information of the plurality of gates is a pre-received value.

20. The user terminal of claim 10, wherein the location information of the user terminal is based on location coordinates from an anchor.

* * * * *